(12) United States Patent
Park et al.

(10) Patent No.: US 12,372,298 B2
(45) Date of Patent: Jul. 29, 2025

(54) REFRIGERATOR HAVING DOOR WITH WEIGHT-SENSITIVE STORAGE AREA AND METHOD OF MANAGING ITEMS STORED IN WEIGHT-SENSITIVE STORAGE AREA

(71) Applicant: Samsung Electronics Co., Ltd., Suwon-si (KR)

(72) Inventors: Kitae Park, Suwon-si (KR); Kilyun Jeong, Suwon-si (KR); Daewoong Park, Suwon-si (KR); Heejung Youn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 599 days.

(21) Appl. No.: 17/740,985

(22) Filed: May 10, 2022

(65) Prior Publication Data

US 2023/0047137 A1 Feb. 16, 2023

Related U.S. Application Data

(63) Continuation of application No. PCT/KR2022/004152, filed on Mar. 24, 2022.

(30) Foreign Application Priority Data

Aug. 13, 2021 (KR) .......................... 10-2021-0107622

(51) Int. Cl.
*F25D 29/00* (2006.01)
*F25D 25/02* (2006.01)
*G01G 19/52* (2006.01)

(52) U.S. Cl.
CPC .............. *F25D 29/00* (2013.01); *F25D 25/02* (2013.01); *G01G 19/52* (2013.01); *F25D 2400/36* (2013.01); *F25D 2700/04* (2013.01)

(58) Field of Classification Search
CPC ...... F25D 29/00; F25D 25/02; F25D 2500/06; F25D 29/005; F25D 2900/08;
(Continued)

(56) References Cited

U.S. PATENT DOCUMENTS 7,340,414 B2 3/2008 Roh et al.
8,371,135 B2 * 2/2013 Lee .......................... F25D 29/00
62/331

(Continued)

FOREIGN PATENT DOCUMENTS

CN 112648790 A 4/2021
DE 2019 212459 2/2021
(Continued)

OTHER PUBLICATIONS

PCT/ISA/220; PCT/ISA/210 and PCT/ISA/237 dated Jun. 30, 2022 in International Patent Application No. PCT/KR2022/004152 ( 9 pages; 10 pages English Translation).
(Continued)

*Primary Examiner* — Jacques M Saint Surin
(74) *Attorney, Agent, or Firm* — STAAS & HALSEY LLP

(57) ABSTRACT

Provided is a refrigerator including a door, a door shelf provided on the door and including a weight-sensitive storage area for sensing a weight of an item, a weight transmission device installed on the door shelf and configured to transmit information about the sensed weight, a user interface including a display and an inputter, and a processor configured to manage item information, based on the information about the sensed weight received from the weight transmission device, and control the display to display management information about the item.

22 Claims, 26 Drawing Sheets

(58) Field of Classification Search
CPC .. F25D 23/04; F25D 2400/361; F25D 23/028;
F25D 2400/36; F25D 2700/06; F25D
2700/04; H02J 50/10; G01G 19/42
See application file for complete search history.

(56) References Cited

U.S. PATENT DOCUMENTS

| | | | |
|---|---|---|---|
| 9,170,045 B2* | 10/2015 | Oh | F25D 23/04 |
| 9,412,086 B2* | 8/2016 | Morse | G06K 7/1417 |
| 9,719,720 B2* | 8/2017 | Seo | F25D 29/00 |
| 9,803,909 B2* | 10/2017 | Son | F25D 25/02 |
| 10,598,248 B2* | 3/2020 | Naserimojarad | F16F 9/53 |
| 10,627,156 B2* | 4/2020 | Kang | F25D 25/025 |
| 10,808,991 B2* | 10/2020 | Kim | F25D 27/005 |
| 10,876,788 B2* | 12/2020 | Choi | F25D 25/025 |
| 11,073,327 B2* | 7/2021 | Kim | F25D 23/028 |
| 11,131,501 B2* | 9/2021 | Kim | F25D 25/025 |
| 11,694,501 B2* | 7/2023 | Friend | G07F 9/026 |
| | | | 700/236 |
| 2011/0016910 A1 | 1/2011 | Bak | |
| 2014/0320647 A1 | 10/2014 | Seo et al. | |
| 2020/0278238 A1 | 9/2020 | Lane et al. | |
| 2021/0108958 A1 | 4/2021 | Kempfle et al. | |

FOREIGN PATENT DOCUMENTS

| | | |
|---|---|---|
| JP | 2007-113818 | 5/2007 |
| JP | 6473523 | 2/2019 |
| KR | 10-0409005 B1 | 12/2003 |
| KR | 10-0499021 B1 | 7/2005 |
| KR | 10-0673435 B1 | 1/2007 |
| KR | 10-2008-0096620 A | 10/2008 |
| KR | 10-2010-0131654 | 12/2010 |
| KR | 10-2014-0040458 | 4/2014 |
| KR | 10-2014-0127590 | 11/2014 |
| KR | 10-1560680 B1 | 11/2015 |
| KR | 10-2017-0093640 | 8/2017 |
| KR | 10-1946367 | 2/2019 |
| KR | 10-2024595 | 9/2019 |
| WO | WO 2016/151814 A1 | 9/2016 |
| WO | WO 2017/135528 A1 | 8/2017 |
| WO | WO 2020/196987 A1 | 10/2020 |

OTHER PUBLICATIONS

Partial Supplementary European Search Report issued on Aug. 20, 2024 for European Patent Application No. 22855946.4.
Extended European Search Report issued on Oct. 9, 2024 for European Patent Application No. 22855946.4.

* cited by examiner

REFRIGERATOR HAVING DOOR WITH WEIGHT-SENSITIVE STORAGE AREA AND METHOD OF MANAGING ITEMS STORED IN WEIGHT-SENSITIVE STORAGE AREA

CROSS-REFERENCE TO RELATED APPLICATION(S)

This application is a continuation application, under 35 U.S.C. § 111(a), of International Application No. PCT/KR2022/004152, filed Mar. 24, 2022, which is based on and claims priority under 35 U.S.C. § 119 to Korean Patent Application No. 10-2021-0107622 filed on Aug. 13, 2021, the disclosure of which is incorporated herein by reference in its entirety.

FIELD

Embodiments of the disclosure relate to a refrigerator capable of sensing the weight of an item stored in a door thereof and a method of managing the item according to a result of the sensing.

DESCRIPTION OF RELATED ART

A refrigerator is a device that stores items, e.g., food, which need to be refrigerated or frozen. The refrigerator includes a main body and a door for opening and closing the main body. The main body is provided with storage shelves across the main body, and items are placed on the storage shelves. The door is provided with door shelves and items are placed on the door shelves.

Various techniques for sensing whether there is an item in a refrigerator have been introduced. For example, a refrigerator with a sensor for sensing whether there is an item on a storage shelf has been introduced. Whether there is an item may be determined by sensing the weight of a storage shelf itself or according to whether the weight of an item is sensed using a weight-sensitive scale installed on the storage shelf.

SUMMARY

According to an embodiment of the disclosure, a refrigerator includes a door, a door shelf provided at the door and including a weight-sensitive storage area for sensing a weight value of an item positioned on the weight-sensitive storage area, a weight transmission transceiver installable on the door shelf and configured to transmit information about the sensed weight value, a user interface including a display and an inputter, and a processor configured to manage item information, based on the sensed weight value received from the weight transmission transceiver, and control the display to display management information about the item.

For example, the weight-sensitive storage area may include a plurality of weight-sensitive sections.

For example, the weight-sensitive storage area may include a first member supported on the door shelf, and a plurality of second members supported on the first member with a weight-sensitive sensor interposed therebetween, configured to have items placed thereon, and corresponding to one of the plurality of weight-sensitive sections, and the weight-sensitive sensor is connected to the weight transmission transceiver.

For example, the refrigerator may further include a blocking member provided between the plurality of second members and configured to restrict movement of items positioned on the plurality of second members.

For example, the blocking member is formed to protrude from the first member higher than upper surfaces of the plurality of second members.

For example, the refrigerator may further include a blocking member configured to be switched between being at a blocking position at which movement of items is blocked and being at a retreat position away from the blocking position.

For example, the door shelf may include a simple storage area which does not sense a weight of an item, and a partition wall configured to separate the weight-sensitive storage area and the simple storage area from each other.

For example, the weight-sensitive storage area may include a plurality of weight-sensitive sections for independently sensing a weight, and the refrigerator may further include a blocking member configured to be switched between being at a blocking position for restricting movement of items between two adjacent weight-sensitive sections among the plurality of weight-sensitive section and being at a retreat position away from the blocking position, the blocking member being installed on the partition wall.

For example, the refrigerator may further include a power supply provided at the door and configured to supply power to the weight transmission transceiver, and a power receiver connectable to the weight transmission transceiver, and provided at the door shelf to connect to the power supply when the door shelf is mounted on the door.

For example, the power supply may include a wireless power transmitter, the power receiver may include a wireless power receiver connectable to the weight transmission transceiver and provided at the door shelf to face the wireless power transmitter when the door shelf is mounted on the door, and the refrigerator further may include a moisture-blocking wall configured to protect the wireless power transmitter from moisture, the moisture-blocking wall provided on the door to protrude along edges of the wireless power transmitter.

For example, the wireless power receiver may be at least partially recessed in a wall forming an outer side of the door shelf.

For example, the weight transmission transceiver may be further configured to transmit the sensed weight value to the processor by a Bluetooth communication method.

For example, the display may include a touch panel display integrated with the inputter.

For example, the processor may be further configured to: receive information about an item to be stored on the weight-sensitive storage area of the door shelf, through the inputter and set the received information as initial information about the item; when the sensed weight value is the same as a set weight, set a stock date when the sensed weight value has been transmitted; and control the display to display the stock date.

For example, the processor may be further configured to control the display to display a time period elapsed after a date when the item was stored, based on the stock date.

For example, the processor may be further configured to control the display to display a residual quantity of the item, based on the sensed weight value.

For example, when a residual quantity of the item is equal to or less than a first residual quantity, based on the sensed weight value, the processor may be further configured to control the display to display a notification displaying that exhaustion of the item is imminent.

For example, when a residual quantity of the item is equal to or less than a second residual quantity, based on the sensed weight value, the processor may be further configured to control the display to display a result of searching a shopping site for an item of the same type as the item.

When the weight-sensitive storage area includes a plurality of weight-sensitive sections, the processor may be further configured to set at least two adjacent weight-sensitive sections together as one weight-sensitive section by using the user interface and control the display to display a result of the setting on the display.

The processor may be further configured to transmit the sensed weight value to an external device.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
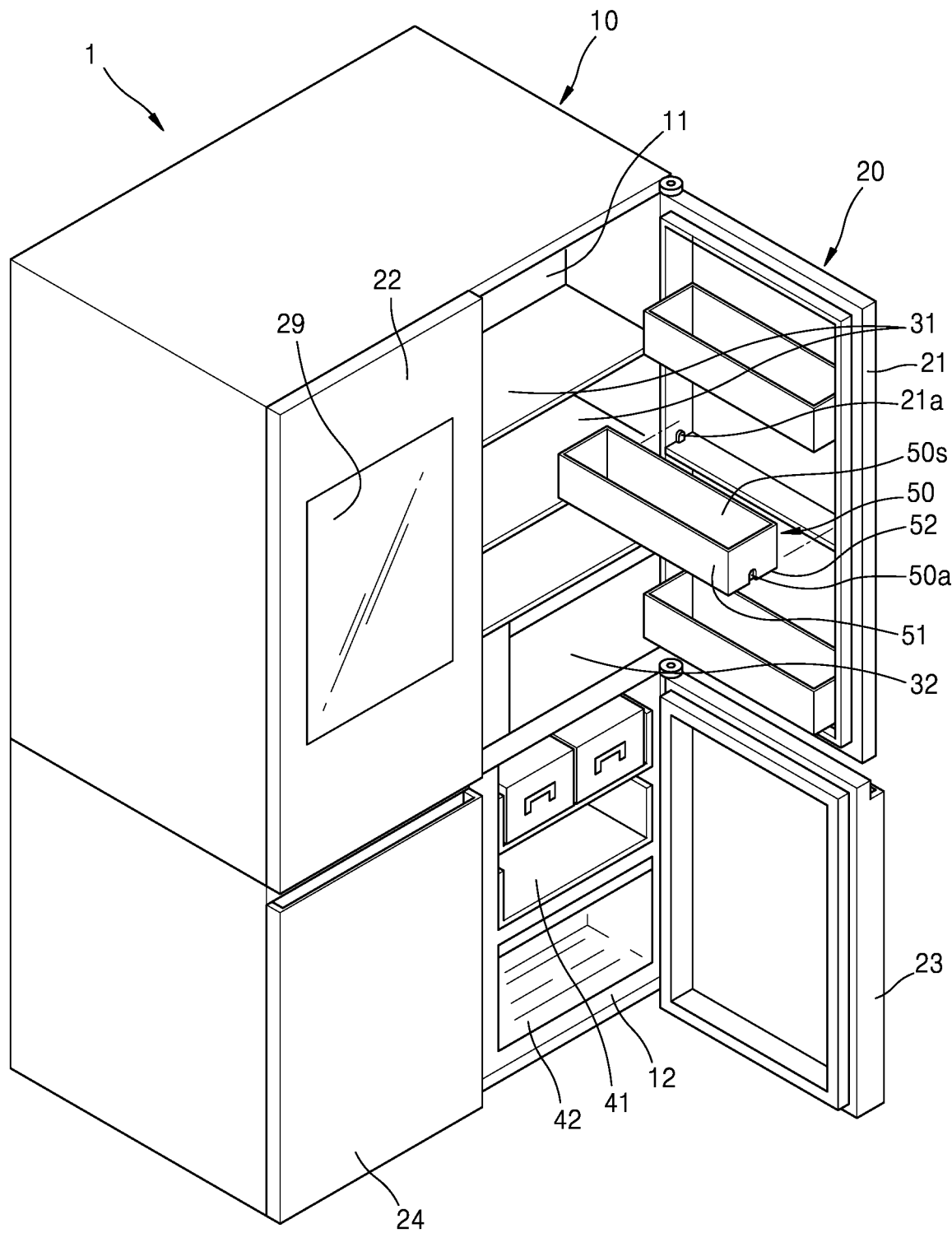
FIG. 1 is a perspective view of a refrigerator according to an embodiment of the disclosure.

Throughout the disclosure, the expression "at least one of a, b or c" indicates only a, only b, only c, both a and b, both a and c, both b and c, all of a, b, and c, or variations thereof.

In the present specification, general terms that have been widely used nowadays are selected, when possible, in consideration of functions of the disclosure, but non-general terms may be selected according to the intentions of technicians in the this art, precedents, or new technologies, etc. Some terms may be arbitrarily chosen by the present applicant. In this case, the meanings of these terms will be explained in corresponding parts of the disclosure in detail. Thus, the terms used herein should be defined not based on the names thereof but based on the meanings thereof and the whole context of the disclosure. It will be understood that when an element is referred to as "including" another element, the element may further include other elements unless mentioned otherwise.

Hereinafter, embodiments of the disclosure will be described in detail with reference to the accompanying drawings, so that the embodiments of the disclosure may be easily implemented by those of ordinary skill in the art. However, the disclosure may be embodied in many different forms and is not limited to the embodiments of the disclosure set forth herein. For clarity, parts not related to explaining the disclosure are omitted in the drawings, and like components are denoted by like reference numerals throughout the specification. Hereinafter, embodiments of the disclosure will be described in detail with reference to the accompanying drawings.

Multiple storage shelves are installed inside a main body of a refrigerator in a vertical direction, and when a weight-sensitive scale is installed on each of the storage shelves, a gap between the storage shelves decreases due to the height of the weight-sensitive scale and thus heights of items to be stored on the storage shelves may be greatly limited. When a battery is used to operate the weight-sensitive scale, battery efficiency is low due to the low temperature inside the refrigerator and the battery should be replaced periodically. When the total weight of the storage shelves is sensed, only the weights of items placed on the storage shelves are sensed regardless of the types and total number of the items and thus only whether there are items on the storage shelves can be substantially sensed.

The disclosure provides a refrigerator capable of stably sensing the weight of an item stored on a door shelf. The disclosure provides a refrigerator capable of storing various types of items on door shelves and stably sensing whether an item has been stored and the weight of the item. The disclosure provides a refrigerator in which weight-sensitive areas of door shelves are provided in various combinations. The disclosure provides a refrigerator capable of providing a user with various information about stored items through a user interface, based on a weight sensing result, and a method of managing the stored items.

With a refrigerator and a method of managing an item stored therein according to the disclosure, the weight of an item stored on a door shelf can be stably sensed. The weights of various types of items stored on a door shelf can be stably sensed, and various information about the stored items can be provided to a user through a user interface or an external device such as a mobile device, based on the sensed weights. In addition, weight-sensitive areas of the door shelf can be provided in various combinations, and the weights of stored items having various sizes and shapes can be stably sensed and information about the stored items can be provided.

FIG. 1 is a perspective view of a refrigerator according to an embodiment of the disclosure. Referring to FIG. 1, a refrigerator 1 may include a main body 10 and at least one door 20 for opening or closing a front part of the main body 10. The main body 10 may include a fridge compartment 11 and a freezer compartment 12. The at least one door 20 may include a pair of doors 21 and 22 for opening or closing the fridge compartment 11 and a pair of doors 23 and 24 for opening or closing the freezer compartment 12. The fridge compartment 11 may be provided with a plurality of storage shelves 31 arranged in a vertical direction. The fridge compartment 11 may be provided with a drawer type storage container 32. The drawer type storage container 32 may be located at a lowest part of the fridge compartment 11. The freezer compartment 12 may be provided with a plurality of storage shelves 41 arranged in the vertical direction. The freezer compartment 12 may be provided with a drawer type storage container 42. The drawer type storage container 42 may be located at a lowest part of the freezer compartment 12.

The at least one door 20, for example, the doors 21 and 22 of the fridge compartment 11, may be provided with a plurality of door shelves 50 for storing items. Each of the door shelves 50 may include an outer wall 51 and a bottom 52 that form a storage space 50s. The door shelves 50 may be detachably attached to, for example, the door 21. For example, mounting protrusions 21a protruding inwardly and extending in the vertical direction may be provided on both sidewalls of the door 21 in a widthwise direction, and mounting grooves 50a recessed inwardly may be provided on the outer wall 51 of the door shelf 50 to be engaged with the mounting protrusions 21a. The door shelf 50 may be mounted in the door 21 by aligning the mounting grooves 50a and the mounting protrusions 21a with each other and pressing the door shelf 50 downward. Generally, gaps between in the door shelves 51 in the vertical direction are greater than those between the storage shelves 31 of the fridge compartment 11 in the vertical direction. Therefore, relatively tall items, e.g., beverages contained in bottles, may be stored on the door shelves 50. The doors 21, 22, 23, and 24 will be hereinafter referred to together as a door 20. The door shelf 50 is detachably attached onto the door 20.

Figure 2:
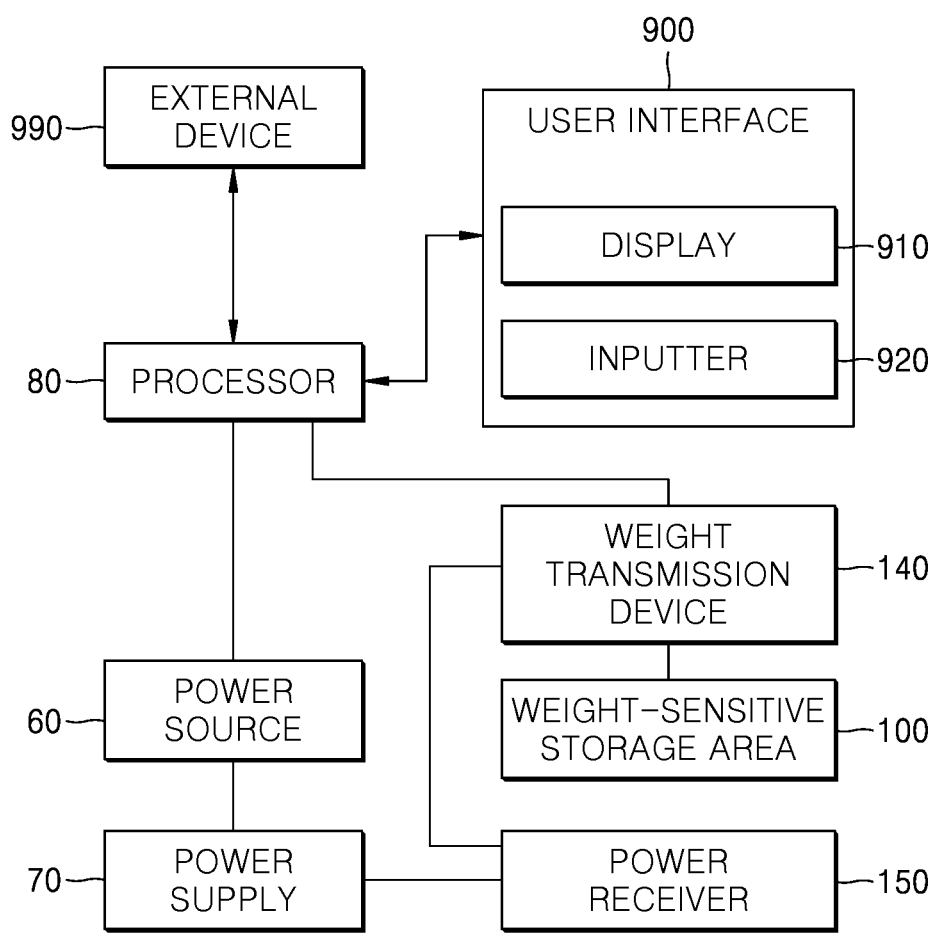
FIG. 2 is a schematic block diagram of an example of the refrigerator of FIG. 1.
Figure 3:
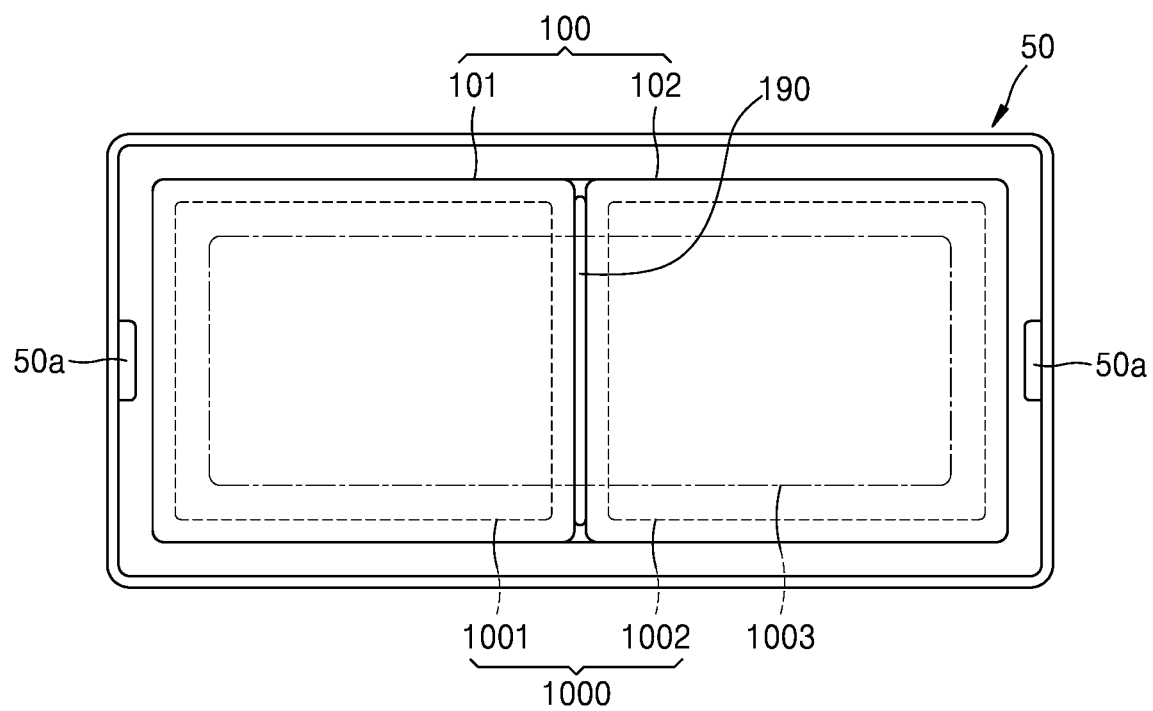
FIG. 3 is a schematic plan view of an example of a door shelf.
Figure 4:
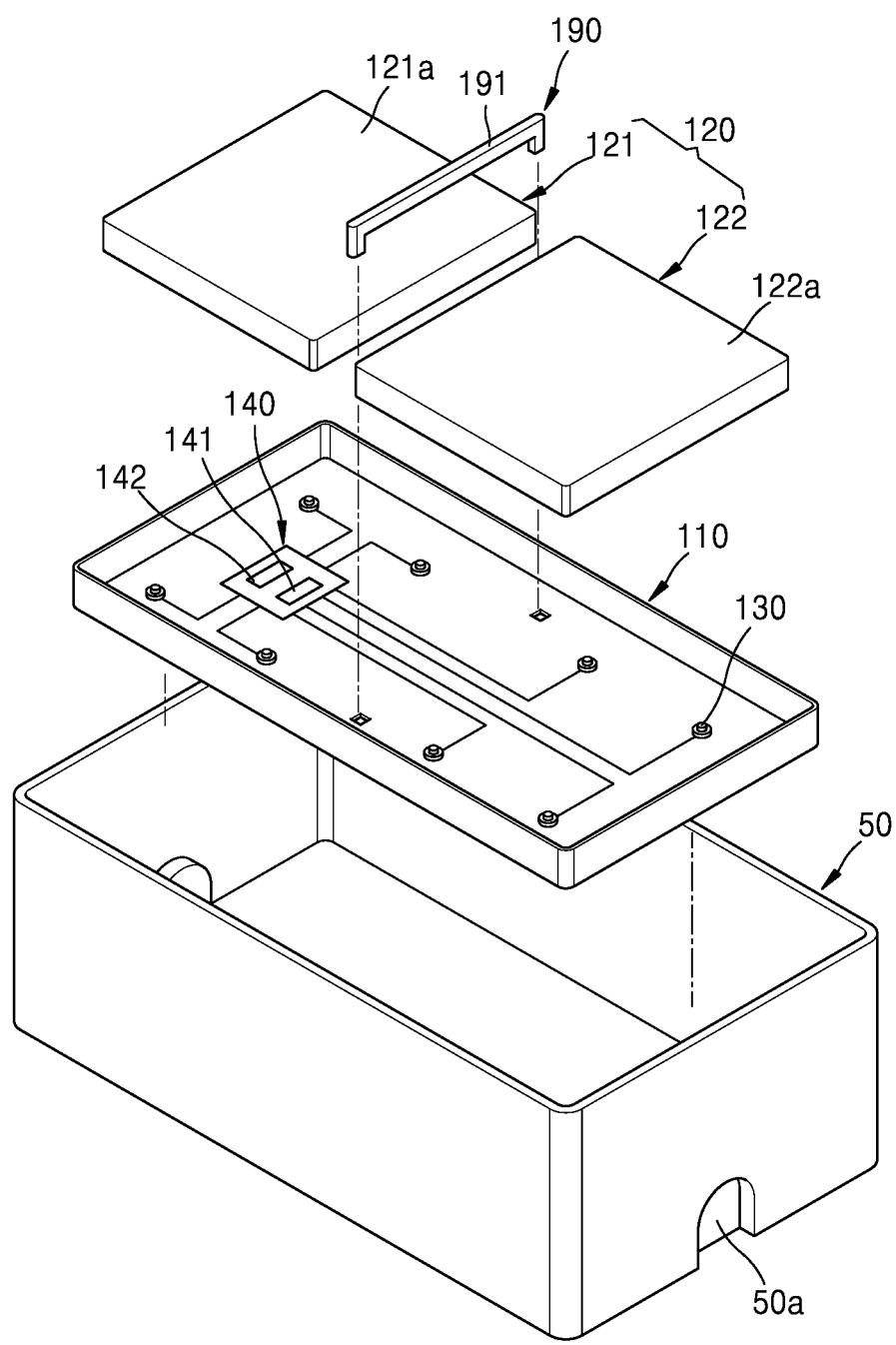
FIG. 4 is a schematic exploded perspective view of an example of the door shelf of FIG. 3.

FIG. 2 is a schematic block diagram of an example of the refrigerator 1 of FIG. 1. FIG. 3 is a schematic plan view of an example of the door shelf 50. FIG. 4 is a schematic exploded perspective view of the example of the door shelf of FIG. 3. Referring to FIGS. 2 to 4, the door shelf 50 of an embodiment of the disclosure includes a weight-sensitive storage area 100 for sensing the weights of items 1000. The door shelf 50 may include a weight transmission device 140 (also referred to as weight transmission transceiver 140) for transmitting sensed weight information of the item 1000. A user interface 900 may include, for example, a display 910 displaying visual information and an inputter 920 for inputting operation information related to the refrigerator 1. A processor 80 may control the display 910 to manage item information on the basis of the weight information received from the weight transmission device 140 and to display item management information. The processor 80 may transmit the weight information received from the weight transmission device 140 to an external device 990.

The weight transmission device 140 may transmit the weight information to the processor 80, for example, by a wired method or a wireless method. For example, the wireless method may include a short-range wireless communication method such as Bluetooth or Wi-Fi. The processor 80 may include, for example, a central processing unit (CPU). Although not shown, the processor 80 may include a memory. The memory may store an application program for providing a graphical user interface (GUI) screen to be described below, basic information of items, item information input by a user, etc. The processor 80 may include a wireless communication module for wireless communication with the weight transmission device 140, for example, a Bluetooth communication module or a Wi-Fi communication module. The processor 80 may transmit the weight information to the external device 990 by a wired communication method or a wireless communication method, e.g., Bluetooth or Wi-Fi. The user interface 900 may be, for example, an operation panel 29 provided on the refrigerator 1, e.g., a door 20. By employing a touch panel display as the display 910, the inputter 920 may be partially or entirely integrated into the display 910. The external device 990 may be a device that includes a display and an inputter unit and is connectable to the refrigerator 1 via a wire or wirelessly. The external device 990 may be a device that includes a configuration, e.g., a processor or a memory, for driving an application program. The external device 990 may be, for example, a personal computer (PC) or a personal portable terminal capable of driving an application program when connected to the refrigerator 1 via a wire or wirelessly. The personal portable terminal may be, for example, a smart phone, a tablet PC or the like.

A separate weight sensing device, e.g., a scale, may be placed on each of storage shelves 31 of a fridge compartment 11 so that an item may be placed on the scale. Generally, a gap between the storage shelves 31 is less than that between door shelves 50. Due to the scales on the storage shelves 31, the gaps between the storage shelves 31 may be reduced. Therefore, tall items are difficult to store on the storage shelves 31. Furthermore, a structure for fixing items on the scale is not provided and thus stored items may fall from the scale. In addition, a battery is mounted into the scale to supply power but the efficiency of the battery is low due to low internal temperature of the fridge compartment 11 and the battery should be exchanged periodically.

A method of sensing a total weight of the storage shelf 31 may be set but in this case, when various types of items are stored on the storage shelf 31, it is impossible to sense weight information of each of the various types of items and thus only one type of items should be stored on the storage shelf 31.

According to the refrigerator 1 of the present embodiment of the disclosure, the weight-sensitive storage area 100 is provided on the door shelf 50 mounted on the door 20. Generally, a gap between the door shelves 50 is greater than that between the storage shelves 31 in the fridge compartment 11. Therefore, tall items may be easily stored on the door shelves 50. Because weight information of an item stored on the weight-sensitive storage area 100 is transmitted to a user interface 900 of the refrigerator 1 or an external device 990, a user is able of check information about the item in almost real time without opening the door 20.

One weight-sensitive storage area 100 may be provided. The weight-sensitive storage area 100 may include a plurality of weight-sensitive sections, e.g., two weight-sensitive sections 101 and 102, for independently sensing a weight of the item 1000. The two weight-sensitive sections 101 and 102 may be the same in size, e.g., in terms of length and width. The two weight-sensitive sections 101 and 102 may be different from each other in size, e.g., in terms of at least one of length or width, to respectively store items 1001 and 1002 having different sizes. The items 1001 and 1002 are shown at a maximum size permitted to be stored on the weight-sensitive sections 101 and 102 but the scope of the disclosure is not limited thereby. For example, several items smaller than the item 1001 may be stored on the weight-sensitive section 101. Similarly, several items smaller than the item 1002 may be stored on the weight-sensitive section 102.

When the weight-sensitive storage area 100 is divided into as a plurality of weight-sensitive sections, various types of items may be individually stored on the plurality of weight-sensitive sections and thus information about each of the various types of items may be checked through the user interface 900 and/or the external device 990. Alternatively, as described below, two or more of the plurality of weight-sensitive sections may be combined together when necessary. Thus, items having various sizes may be stored on the weight-sensitive storage area 100 of the door shelf 50 and information thereof may be checked through the user interface 900 and/or the external device 990.

Various examples of the weight-sensitive storage area 100 will be described below. For example, the weight-sensitive storage area 100 may include a first member 110 supported on the door shelf 50, and a second member 120 which is supported on the first member 110 with a weight-sensitive sensor 130 interposed therebetween and on which the item 1000 is placed. In the present example, two second members 121 and 122 corresponding to the two weight-sensitive sections 101 and 102 are supported on the first member 110 with the weight-sensitive sensor 130 interposed therebetween. A configuration of the weight-sensitive sensor 130 is not particularly limited. For example, the weight-sensitive sensor 130 may be a load cell with a strain gauge. The weight-sensitive sensor 130 generates an electrical signal corresponding to a weight applied thereto. In the present example, four weight-sensitive sensors 130 are provided for each of the second members 121 and 122. The number of the weight-sensitive sensors 130 is not limited thereto, and an appropriate number of weight-sensitive sensors 130 may be employed to reliably sense weights of the items 1001 and 1002 respectively placed on the second members 121 and 122. When the items 1001 and 1002 are respectively placed on the second members 121 and 122, the weight-sensitive sensors 130 generate electric signals corresponding to the weights of the items 1001 and 1002. For example, the weight of the item 1001 on the second member 121 may be dispersed and applied to the four weight-sensitive sensors 130 corresponding to the second member 121, and identified according to the sum of electrical signals generated by the four weight-sensitive sensors 130. Similarly, the weight of the item 1002 on the second member 122 may be dispersively applied to the four weight-sensitive sensors 130 corresponding to the second member 122, and identified according to the sum of electrical signals generated by the four weight-sensitive sensors 130.

When the item 1001 stored on the weight-sensitive section 101 partially moves over the weight-sensitive section 102 or when the item 1002 stored on the weight-sensitive section 102 partially moves over the weight-sensitive section 101, the weights of the items 1001 and 1002 may not be capable of being accurately sensed. Therefore, the refrigerator 1 of the present example may include a blocking member 190 for blocking between the weight-sensitive sections 101 and 102. The blocking member 190 may be provided on the door shelf 50. The blocking member 190 is located between the weight-sensitive sections 101 and 102, i.e., between the second members 121 and 122, to prevent movement of the items 1001 and 1002. For example, the blocking member 190 may be supported on the first member 110 to protrude between the second members 121 and 122. An upper surface 191 of the blocking member 190 is higher than receiving surfaces 121a and 122b of the second members 121 and 122. Thus, for example, even when impact is applied during the opening or closing of the door 20, the items 1001 and 1002 are blocked by the blocking member 190 to be prevented from passing between a pair of second members 121 and 122. Therefore, the weights of the items 1001 and 1002 may be individually and accurately sensed.

The plurality of weight-sensitive sensors 130 are connected to the weight transmission device 140. The weight transmission device 140 may include a signal processor 141 that processes multiple electrical signals transmitted from, for example, multiple weight-sensitive sensors 130 and generates multiple weight signals, and a transmitter 142 that transmits the multiple weight signals to the processor 80. The weight signals may be, for example, digital signals corresponding to weights applied on the weight-sensitive sensors 130. In this case, the signal processor 141 may include an amplifier that amplifies an electrical signal transmitted from the weight-sensitive sensor 130, a low-pass filter that removes noise, and an analog-to-digital converter (ADC) that converts an electrical signal into a digital signal. The transmitter 142 may transmit multiple weight signals generated by the signal processor 141 to the processor 80, for example, through a wired connection. The transmitter 142 may transmit the multiple weight signals to the processor 80 by a wireless communication method. The wireless communication method may include, for example, Bluetooth, Wi-Fi, and the like. To this end, the transmitter 142 and the processor 80 may each include a Bluetooth communication module or a Wi-Fi communication module. In the present example, the weight transmission device 140 transmits weight information to the processor 80 by the Bluetooth communication method.

The two weight-sensitive sections 101 and 102 may be combined together in some cases. For example, the blocking member 190 may be removed when a large item 1003 is stored on the door shelf 50 as marked by an alternated long and short dash line in FIG. 3. In this case, the two weight-sensitive sections 101 and 102 may be combined and the large item 1003 may be placed over the two weight-sensitive sections 101 and 102.

Figure 5:
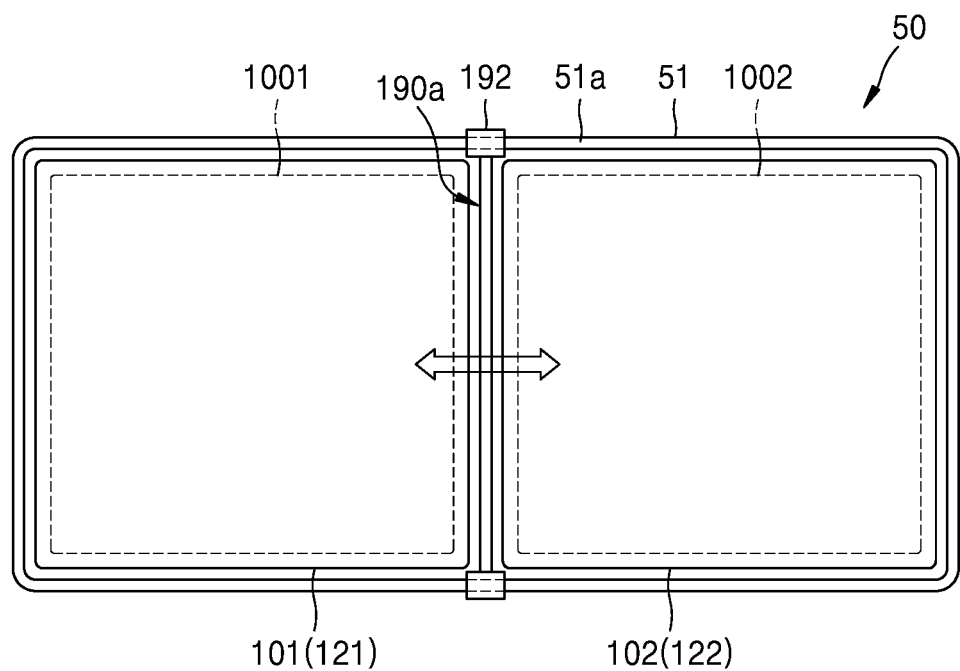
FIG. 5 is a schematic plan view of an example of a door shelf, in which a blocking member is located at a blocking position.
Figure 6:
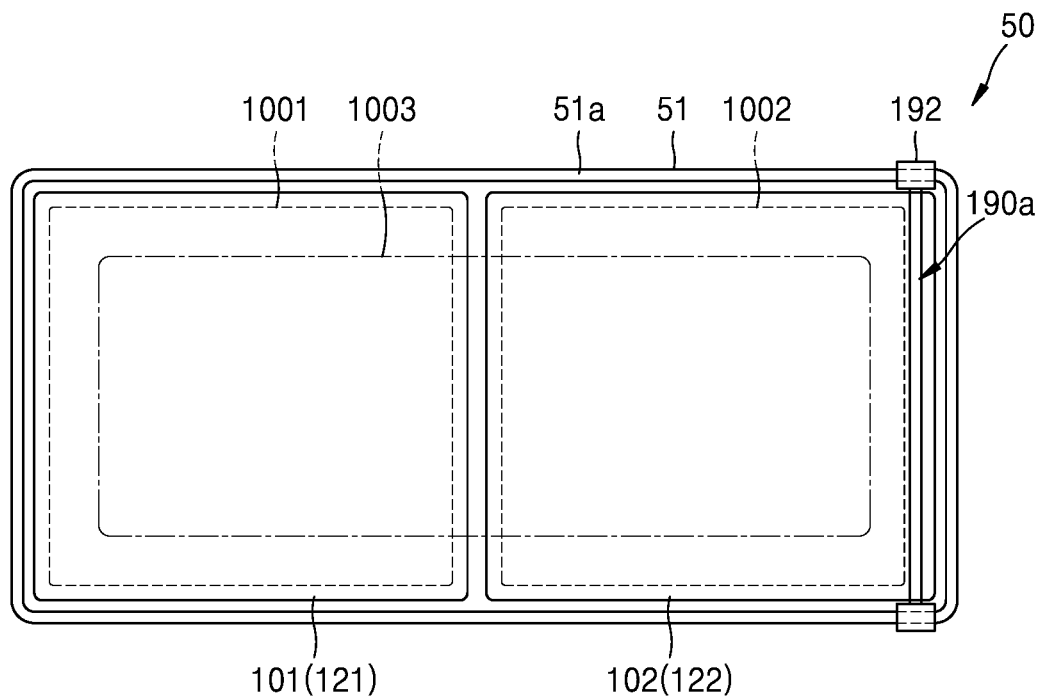
FIG. 6 is a schematic plan view of an example of a door shelf, in which a blocking member is located at a retreat position.

A blocking member configured to be switched between a blocking position at which movement of an item is blocked and a retreat position away from the blocking position, thus permitting combination of two weight-sensitive sections may be employed. FIGS. 5 and 6 are schematic plan views of an example of the door shelf 50. FIG. 5 illustrates a state in which a blocking member is located at the blocking position, and FIG. 6 illustrates a state in which the blocking member is located at the retreat position. Referring to FIGS. 5 and 6, the door shelf 50 of the present example includes a blocking member 190a configured to be switched between a blocking position at which movement of adjacent items 1001 and 1002 between two weight-sensitive sections 101 and 102 is blocked and the retreat position away from the blocking position, thus permitting movement of the items 1001 and 1002. That is, the blocking member 190a may be switched between the blocking position at which movement of the items 1001 and 1002 between a pair of second members 121 and 122 neighboring to each other is blocked and the retreat position away from the blocking position. The switching may be implemented, for example, by sliding, rotation or the like.

For example, the blocking member 190a may slide to the blocking position or the retreat position. The blocking member 190a may be slidably supported on an outer wall 51 of the door shelf 50. For example, an upper edge 51a of the outer wall 51 may function as a rail, and the blocking member 190a may be provided with an engaging portion 192 to be slidably engaged with the upper edge 51a of the outer wall 51. As shown in FIG. 5, the blocking member 190a may be located at the blocking position between the pair of second members 121 and 122. In this case, the items 1001 and 1002 may be stably stored on the weight-sensitive sections 101 and 102, i.e., the second members 121 and 122, respectively. The items 1001 and 1002 are prevented from being moved away from the weight-sensitive sections 101 and 102 due to the blocking member 190a even when the items 1001 and 1002 are swayed or moved due to impact during the opening or closing a door 20.

As shown in FIG. 6, the blocking member 190a may be moved away from the pair of second members 121 and 122 and slide to the retreat position at an edge of the door shelf 50. In this case, an item 1003 larger than the items 1001 and 1002 may be placed over the weight-sensitive sections 101 and 102. A weight of the item 1003 may be sensed by, for example, eight weight-sensitive sensors 130 corresponding to the pair of second members 121 and 122. As described below, a user may set whether to combine the weight-sensitive sections 101 and 102 through the user interface 900 and/or the external device 990.

Figure 7:
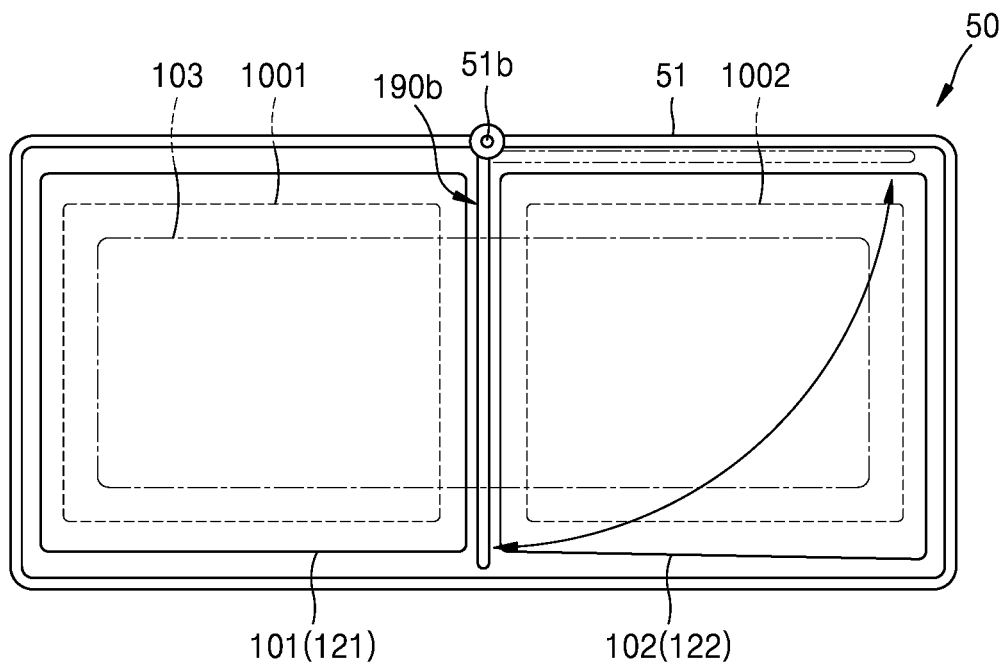
FIG. 7 is a schematic plan view of an example of a door shelf.

FIG. 7 is a schematic plan view of an example of the door shelf 50. The door shelf 50 of the present example is different from the embodiment of the door shelf 50 of FIGS. 5 and 6 in that a blocking member 190b is rotatable to the blocking position or the retreat position. For example, a hinge 51b is provided on an outer wall 51 of the door shelf 50. The hinge 51b may be provided between weight-sensitive sections 101 and 102, i.e., between a pair of second members 121 and 122. The blocking member 190b may be rotated about the hinge 51b to be moved to a blocking position (indicated by a solid line in FIG. 7) at which movement of items 1001 and 1002 between the weight-sensitive sections 101 and 102, i.e., between the pair of second members 121 and 122, is blocked or a retreat position (indicated by a dotted line in FIG. 7) at which storing of a large item 1003 is permitted. The retreat position may be, for example, a position at which the blocking member 190b is in parallel with the sidewall 51 of the door shelf 50 on which the hinge 51b is installed. When the blocking member 190b is located at the blocking position, the items 1001 and 1002 may be stably stored in the weight-sensitive sections 101 and 102, i.e., on the pair of second members 121 and 122, and thus weights of the items 1001 and 1002 may be stably sensed. When the blocking member 190b is located at the retreat position, the item 1003 may be stored over the weight-sensitive sections 101 and 102 and a weight thereof may be sensed by, for example, eight weight-sensitive sensors 130 corresponding to the pair of second members 121 and 122. As described below, a user may set whether to combine the weight-sensitive sections 101 and 102 through the user interface 900 and/or the external device 990.

Referring back to FIG. 2, an example of the refrigerator 1 includes a power supply structure for supplying power to the door shelf 50. The power supply structure may include a power supply 70 on a door 20, and a power receiver 150 connected to a weight transmission device 140 and provided on the door shelf 50. The power supply 70 may be connected to a power source 60 of the refrigerator 1. The power receiver 150 may be electrically connected to the power supply 70 when the door shelf 50 is mounted on the door 20. The power receiver 150 and the power supply 70 may be connected in various forms.

Figure 8:
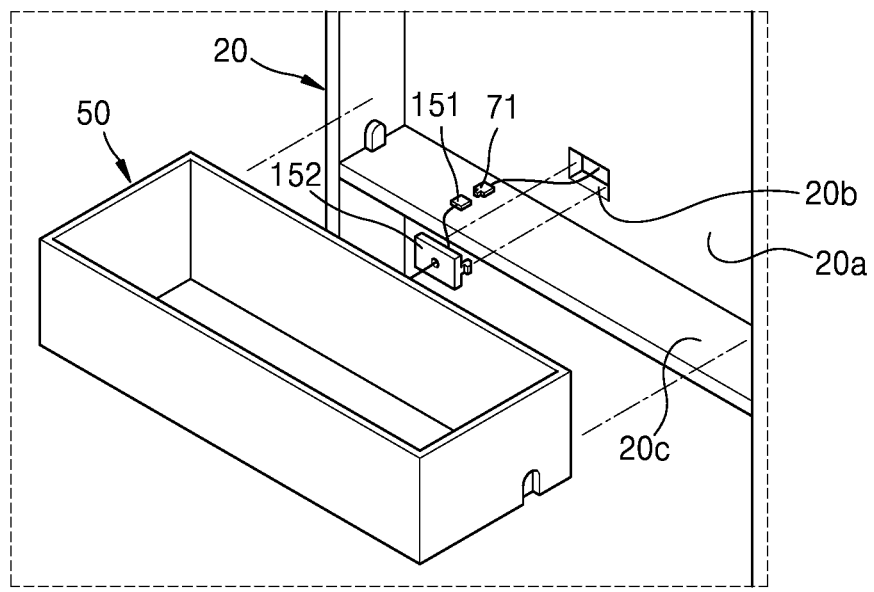
FIG. 8 is a schematic cross-sectional view of an example of a wired connection structure of a power receiver and a power supply.

For example, the power receiver 150 and the power supply 70 may be connected in a wired manner. FIG. 8 is a schematic cross-sectional view of an example of a wired connection structure of the power receiver 150 and the power supply 70. The wired connection structure of the present example includes a connector connection structure. Referring to FIG. 8, a storage hole 20b may be provided in a wall 20a of the door 20. The power supply 70 may include a first connector 71 drawable out of the wall 20a of the door 20 through the storage hole 20b. The first connector 71 may be connected to the power source 60 of FIG. 2. The power receiver 150 may include a second connector 151 connected to the weight transmission device 140 of FIG. 2 via a wire and drawn out of the door shelf 50. The second connector 151 extends through a cover 152. The first connector 71 and the second connector 151 may be a male connector and a female connector configured to be coupled to each other. In a state in which the first connector 71 and the second connector 151 are coupled to each other, the first connector 71 and the second connector 151 may be pushed into the wall 20a of the door 20 through the storage hole 20b to fit the cover 152 over the storage hole 20b. Thereafter, the door shelf 50 may be mounted on the door 20. According to the above structure, the first connector 71 and the second connector 151 are accommodated inside the wall 20a of the door 20 and thus may be protected from moisture inside the refrigerator 1.

Figure 9:
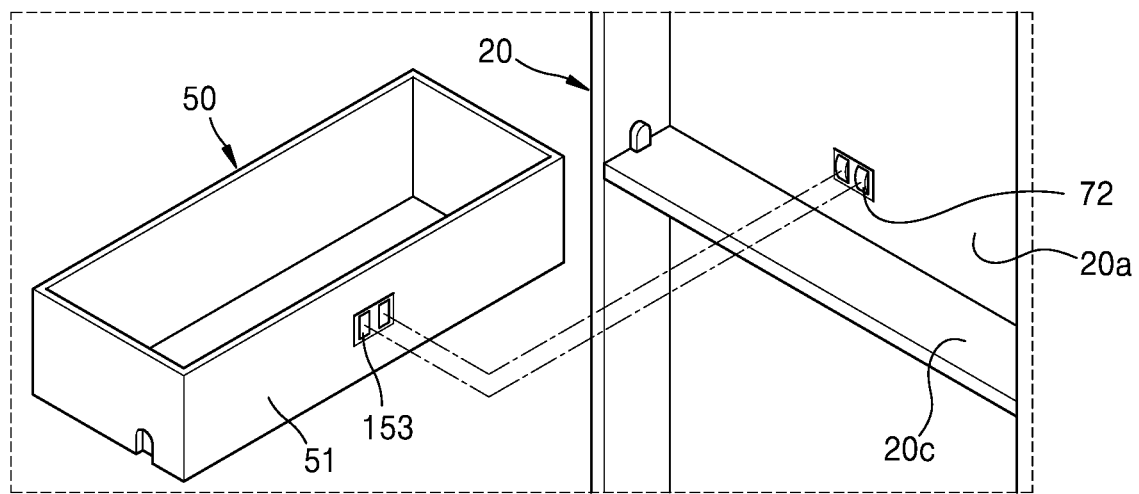
FIG. 9 is a schematic cross-sectional view of an example of a contact terminal connection structure of a power receiver and a power supply.

For example, the power supply 70 and the power receiver 150 may be connected by a contact terminal method. FIG. 9 is a schematic cross-sectional view of an example of a contact terminal connection structure of the power receiver 150 and the power supply 70. Referring to FIG. 9, the power supply 70 may include a first contact terminal 72 provided in the wall 20a of the door 20. The first contact terminal 72 is connected to the power source 60 of FIG. 2. The first contact terminal 72 may be, for example, an elastic terminal having elasticity. The power receiver 150 may include a second contact terminal 153 connected to the weight transmission device 140 of FIG. 2 via a wire and provided on the outer wall 51 of the door shelf 50 facing the wall 20a of the door 20. When the door shelf 50 is mounted on the door 20, the second contact terminal 153 may be brought into contact with the first contact terminal 72 to electrically connect the first and second contact terminals 72 and 153.

Figure 10:
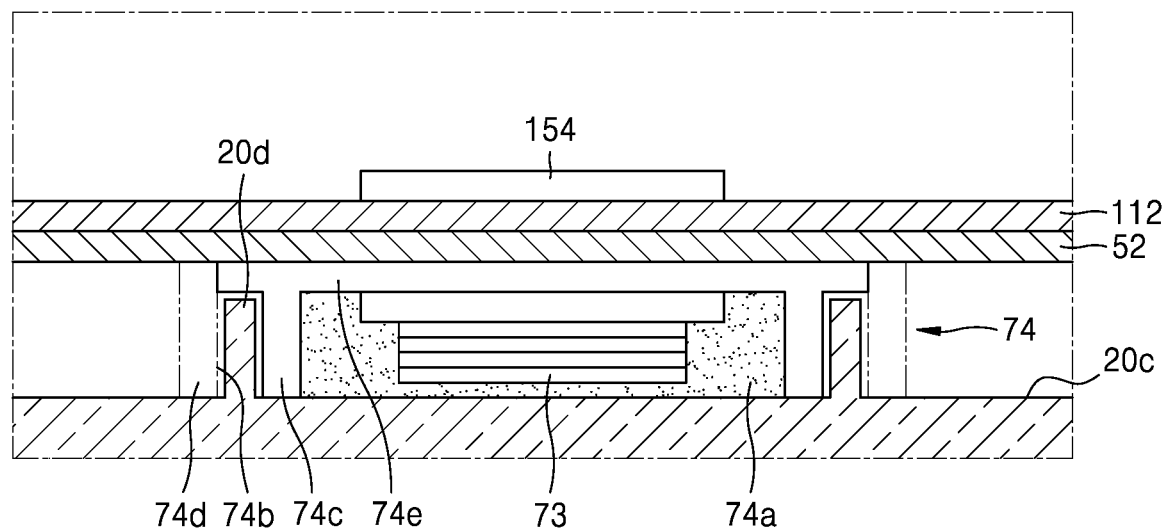
FIG. 10 is a schematic cross-sectional view of an example of a wireless connection structure of a power receiver and a power supply.

For example, the power receiver 150 and the power supply 70 may be connected in a wireless manner. FIG. 10 is a schematic cross-sectional view of an example of a wireless connection structure of the power receiver 150 and the power supply 70. Referring to FIG. 10, the power supply 70 may include a wireless power transmitter 73 provided on the door 20. The wireless power transmitter 73 may be connected to the power source 60 shown in FIG. 2 of the refrigerator 1 via a wire. The power receiver 150 may include a wireless power receiver 154 connected to the weight transmission device 140 of FIG. 2 and provided on the door shelf 50. The wireless power receiver 154 faces the wireless power transmitter 73 when the door shelf 50 is mounted on the door 20. The wireless power transmitter 73 may include a transmission coil, and the wireless power receiver 154 may include a receiving metal plate for receiving power transmitted wirelessly from the transmission coil.

In the present example, the wireless power transmitter 73 is provided in a lower inner wall 20c of the door 20. The wireless power receiver 154 is provided on a lower plate 112 of the first member 110 mounted on the door shelf 50. When the door shelf 50 is mounted on the door 20, the wireless power transmitter 73 and the wireless power receiver 154 are positioned to face each other. The lower inner wall 20c of the door 20 may be affected by moisture. To protect the wireless power transmitter 73 from moisture, the wireless power transmitter 73 is stored in a concave portion 74a of a protective cover 74. The concave portion 74a may be formed by an inner sidewall 74c protruding toward the lower inner wall 20c of the door 20 from an opposite plate 74e facing a bottom 52 of the door shelf 50 and the opposite plate 74e. A waterproof material such as epoxy may be filled in the concave portion 74a. Water drops may form on the lower inner wall 20c of the door 20. The door 20 may be provided with a moisture-blocking wall 20d to prevent water from flowing into the wireless power transmitter 73. The moisture-blocking wall 20d protrudes along edges of the wireless power transmitter 73 from the lower inner wall 20c of the door 20. The moisture-blocking wall 20d may surround the edges of the wireless power transmitter 73. For example, the moisture-blocking wall 20d may be located outside the inner sidewall 74c. Due to the above structure, the wireless power transmitter 73 may be protected from moisture on the lower inner wall 20c of the door 20.

Furthermore, as shown in FIG. 10, the protective cover 74 may be provided with a groove 74b surrounding the wireless power transmitter 73. The groove 74b may be formed by, for example, the inner sidewall 74c and an outer sidewall 74d. The outer sidewall 74d protrudes from the opposite plate 74e toward the lower inner wall 20c of the door 20 and is outwardly spaced apart from the inner sidewall 74c, thus forming the groove 74d between the outer sidewall 74d and the inner sidewall 74c. The moisture-blocking wall 20d protrudes toward the inside of the groove 74b from the lower inner wall 20c of the door 20. Due to the above structure, moisture on the lower inner wall 20c of the door 20 may be effectively blocked by the outer sidewall 74d of the protective cover 74, the moisture-blocking wall 20d of the door 20, and the inner sidewall 74c of the protective cover 74.

Figure 11:
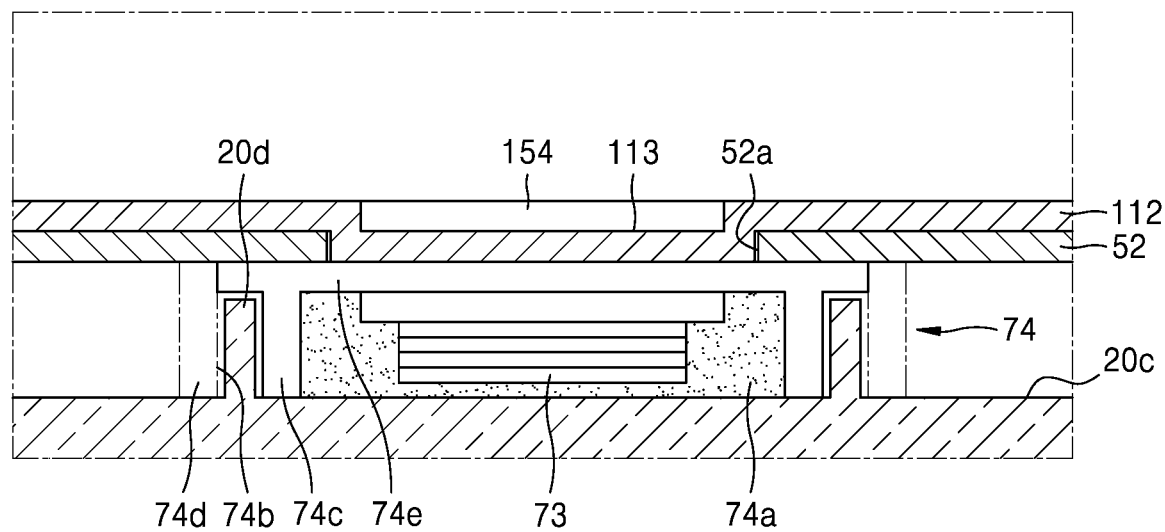
FIG. 11 is a schematic cross-sectional view of an example of a wireless connection structure of a power receiver and a power supply.

As the distance between the wireless power transmitter 73 and the wireless power receiver 154 decreases, wireless power transmission/reception efficiency increases. FIG. 11 is a schematic cross-sectional view of an example of a wireless connection structure of the power receiver 150 and the power supply 70. Referring to FIG. 11, in the present example, the wireless power receiver 154 is provided to be at least partially recessed in a wall that forms an outer side of the door shelf 50. For example, the wall may be the bottom 52 of the door shelf 50. An opening 52a is formed in the bottom 52 of the door shelf 50. The lower plate 112 of the first member 110 is provided with a recess 113 recessed toward the inside of the opening 52a. The wireless power receiver 154 is located in the recess 113. Due to the above structure, the wireless power receiver 154 is closer to the wireless power transmitter 73 as compared to the embodiment of the disclosure of FIG. 10 and thus relatively high wireless power transmission/reception efficiency may be obtained.

Figure 12:
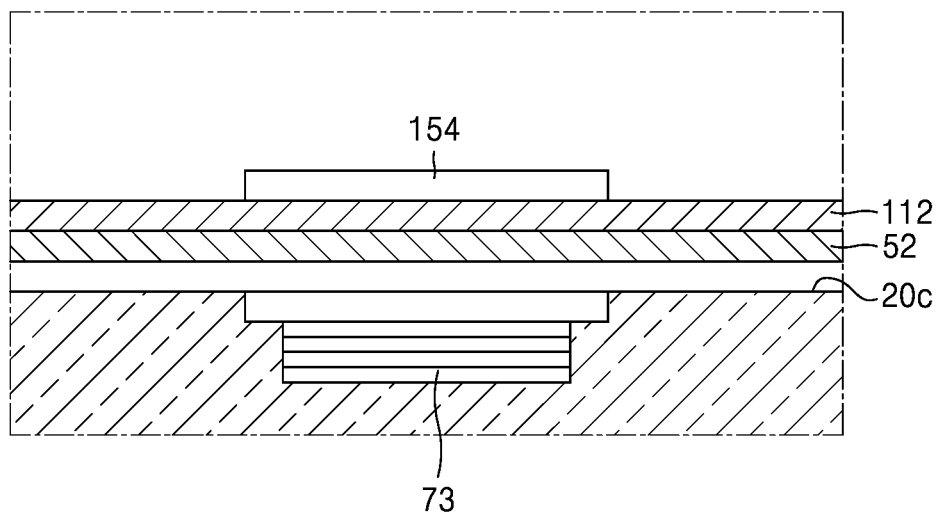
FIG. 12 is a schematic cross-sectional view of an example of a wireless connection structure of a power receiver and a power supply.
Figure 13:
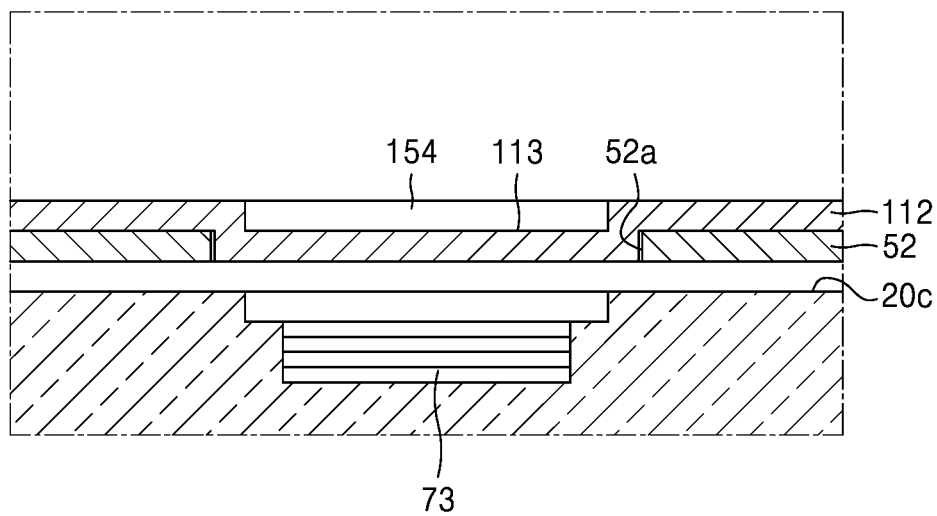
FIG. 13 is a schematic cross-sectional view of an example of a wireless connection structure of a power receiver and a power supply.

FIGS. 12 and 13 are schematic cross-sectional views of examples of a wireless connection structure of the power receiver 150 and the power supply 70. First, referring to FIG. 12, the wireless power transmitter 73 is recessed in the lower inner wall 20c of the door 20. Although not shown, the wireless power transmitter 73 may be recessed in the lower inner wall 20c of the door 20, together with the protective cover 74 of FIG. 10. The other components are as shown in FIG. 10. Referring to FIG. 13, the wireless power transmitter 73 is recessed in the lower inner wall 20c of the door 20, and the wireless power receiver 154 is provided in the recess 113 formed in the first member 110 to be recessed toward the inside of the opening 52a of the bottom 52 of the door shelf 50.

Figure 14:
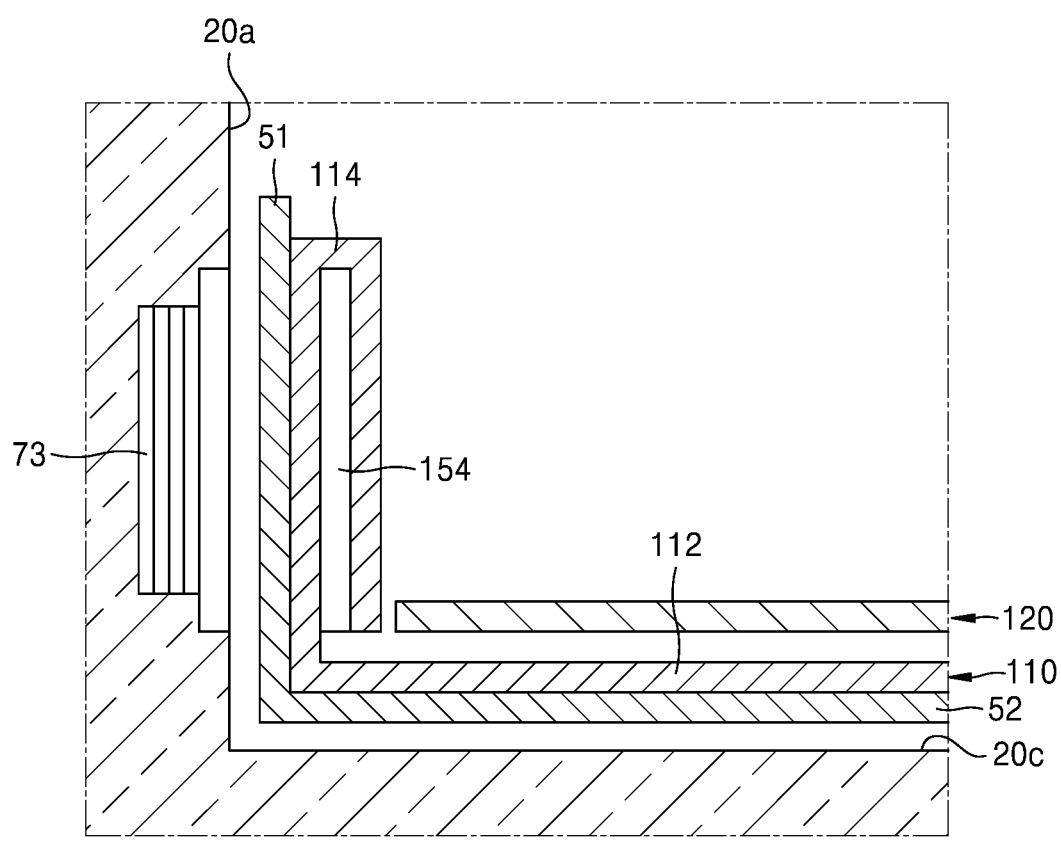
FIG. 14 is a schematic cross-sectional view of an example of a wireless connection structure of a power receiver and a power supply.

In the above-described embodiments of the disclosure, the wireless power transmitter 73 is provided on the lower inner wall 20c of the door 20 but the position thereof is not limited thereto. FIG. 14 is a schematic cross-sectional view of an example of a wireless connection structure of the power receiver 150 and the power supply 70. Referring to FIG. 14, the wireless power transmitter 73 may be recessed the inner sidewall 20a of the door 20. Although not shown, the wireless power transmitter 73 may be recessed in the inner sidewall 20a of the door 20, together with the protective cover 74 of FIG. 10. The wireless power receiver 154 may be installed on a sidewall 114 of the first member 110 to face the wireless power transmitter 73. In this case, the structures of the opening 52a and the recess 113 shown in FIG. 11 are applicable to the structures thereof shown in FIG. 14.

Figure 15:
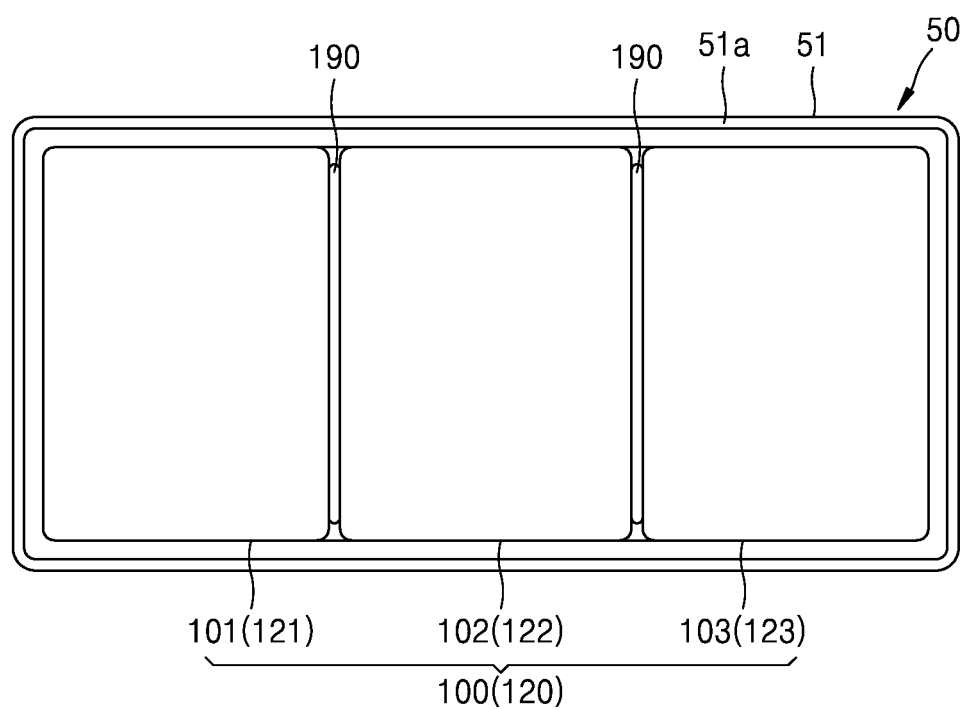
FIG. 15 is a schematic plan view of an example of a door shelf.

The number of weight-sensitive sections is not limited to the above-described embodiments. For example, FIG. 15 is a schematic plan view of an example of the door shelf 50. Referring to FIG. 15, a weight-sensitive storage area 100 may include three weight-sensitive sections 101, 102 and 103. A blocking member 190 may be provided between the weight-sensitive sections 101 and 102 and between the weight-sensitive sections 102 and 103. This structure may be implemented by arranging three second members 121, 122 and 123 on a first member 110 to be spaced apart from one another while a weight-sensitive sensor 103 is interposed therebetween. Two blocking members 190a configured to slide to the blocking position or an the retreat position along an outer wall 51 of the door shelf 50 may be employed instead of the blocking member 190 as shown in FIGS. 5 and 6. Each of the two blocking members 190a may slide along the outer wall 51 of the door shelf 50 to either the blocking position between the second members 121 and 122 or between the second members 122 and 123 or to the retreat position away from the blocking position. Two blocking members 190b rotatable to the blocking position or the retreat position as shown in FIG. 7 may be applied to the door shelf 50, instead of the blocking member 190. Each of the two blocking members 190b is rotatable to the blocking position between the second members 121 and 122 or between the second members 122 and 123 or the retreat position away from the blocking position.

Figure 16:
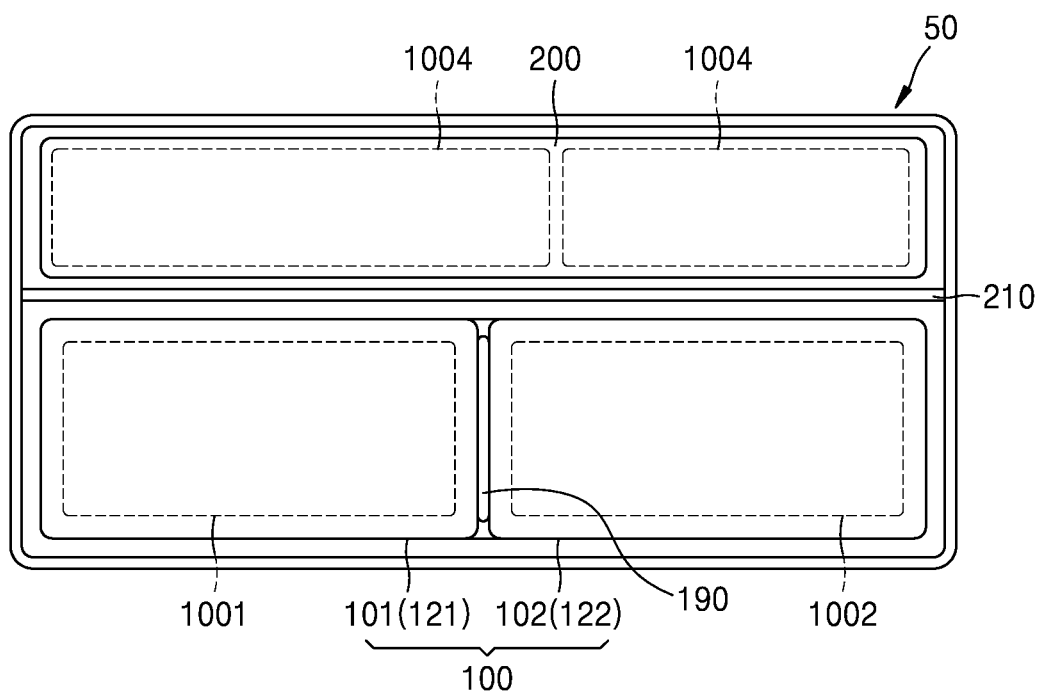
FIG. 16 is a schematic plan view of an example of a door shelf.

FIG. 16 is a schematic plan view of an example of the door shelf 50. Referring to FIG. 16, the door shelf 50 may include a weight-sensitive storage area 100 that senses a weight of an item, and a simple storage area 200 that does not detect a weight of an item. A structure of the weight-sensitive storage area 100 may be as shown in FIG. 4. The weight-sensitive storage area 100 is separated from the simple storage area 200 by a partition wall 210 so that an item 1004 stored on the simple storage area 200 may not be moved to the weight-sensitive storage area 100. A blocking member 190 may be disposed between a weight-sensitive section 101 and a weight-sensitive section 102.

Figure 17:
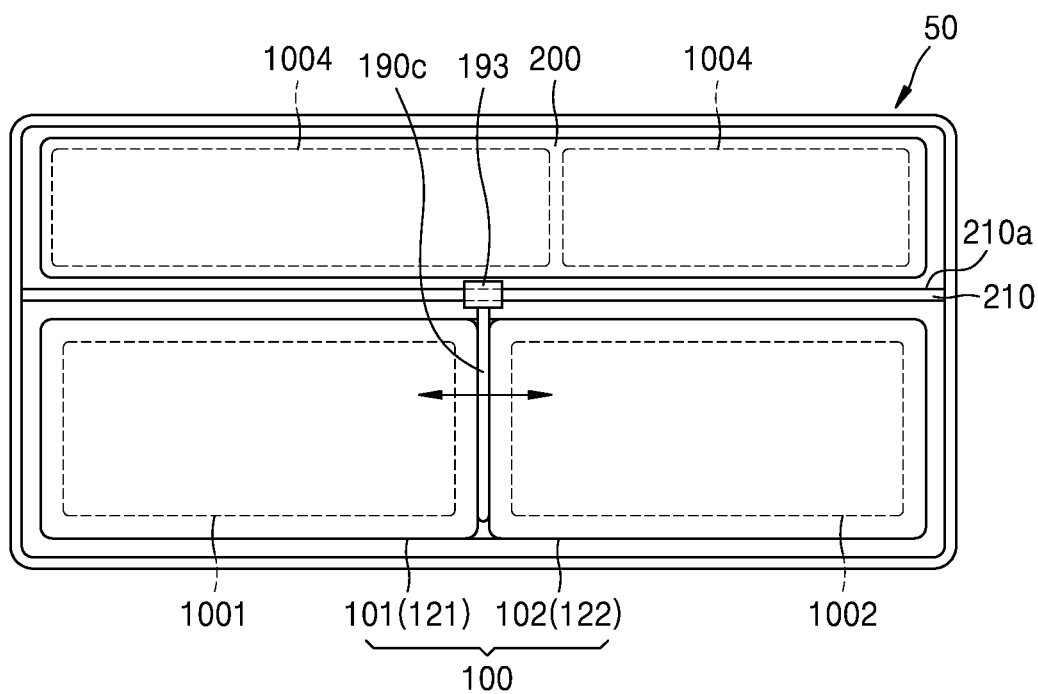
FIG. 17 is a schematic plan view of an example of a door shelf.
Figure 18:
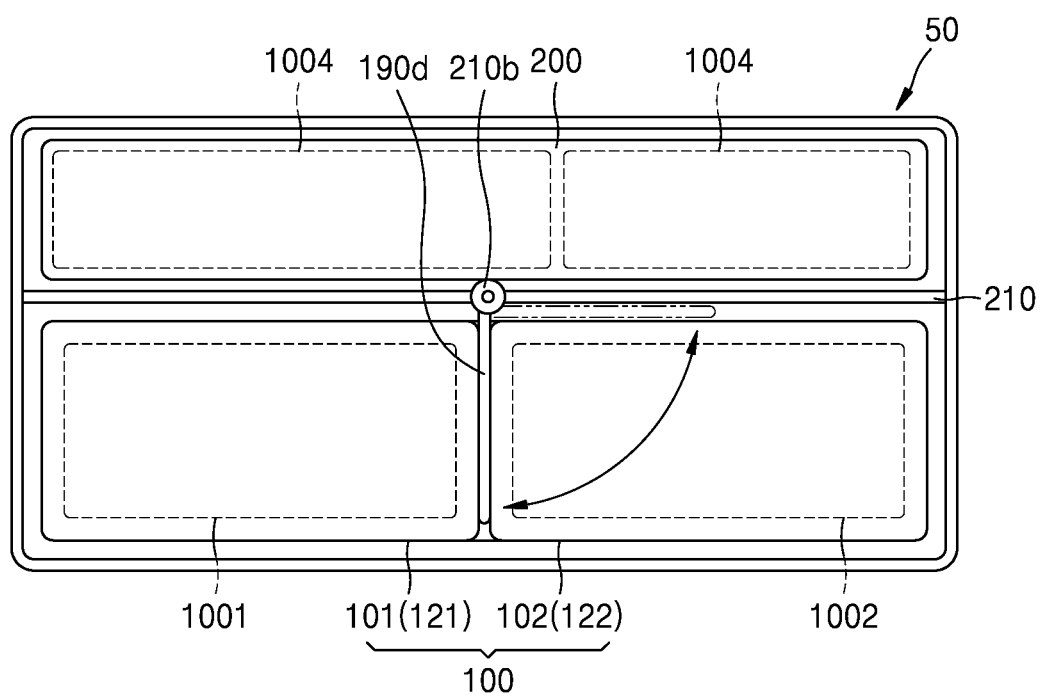
FIG. 18 is a schematic plan view of an example of a door shelf.

FIGS. 17 and 18 are schematic plan views of examples of the door shelf 50. First, referring to FIG. 17, a partition wall 210 is provided with a blocking member 190c configured to be switched to a position that blocks between adjacent two weight-sensitive sections 101 and 102. For example, the blocking member 190c may slide to the blocking position or the retreat position. The blocking member 190c may be supported slidably on the partition wall 210. For example, an upper edge 210a of the partition wall 210 may function as a rail, and the blocking member 190c may be provided with an engaging portion 192 to be slidably engaged with the upper edge 210a of the partition wall 210.

Next, referring to FIG. 18, a blocking member 190d is rotated to the blocking position or the retreat position. For example, a partition wall 210 is provided with a hinge 210b. The hinge 210b may be provided between weight-sensitive sections 101 and 102, i.e., between a pair of second members 121 and 122. The blocking member 190d may be rotated about the hinge 210b to be moved to a blocking position (indicated by a solid line in FIG. 18) at which movement of items 1001 and 1002 between the weight-sensitive sections 101 and 102, i.e., between the pair of second members 121 and 122, is blocked or a retreat position (indicated by a dotted line in FIG. 18) at which storing of a tall item 1003 is permitted. The retreat position may be, for example, a position at which the blocking member 190d is in parallel with the partition wall 210 on which the hinge 210b is installed.

As described above, the user interface 900 may be an operation panel 29 of FIG. 1 provided outside the refrigerator 1, e.g., the door 20, i.e., the door 21 or outside the door 22. As described above, the operation panel 29 may include a display 910 and an inputter 920 configured to receive operation information from a user, and the display 910 and the inputter 920 may be combined together when a touch panel display is employed. For example, when an application program stored in the memory is driven, the processor 80 may display various information about items on the display 910 and manages the various information about the items, based on item information input through the inputter 920 and weight information transmitted from the weight transmission device 140. For example, various information about items may be displayed and managed through a GUI provided through the display 910. The processor 80 may receive information about an item to be stored in a weight-sensitive storage area 100 of the door shelf 50 through the inputter 920 and set the information as item information. The processor 80 may control the display 910 to display the set item information. The processor 80 controls the weight transmission device 140 to sense an item stored on the weight-sensitive storage area 100. The processor 80 may receive weight information sensed by the weight transmission device 140 from the weight transmission device 140. When the sensed weight information is the same as a set weight, the processor 80 may set, as a stock date, a date when the sensed weight information has been transmitted, and display the stock date on the display 910. The processor 80 may display a time period elapsed after a date when the item was stored on the display 910, based on the stock date. The processor 80 may display a residual quantity of the item on the display 910, based on the sensed weight information. The processor 80 may display, on the display 910, a notification displaying that exhaustion of the item is imminent when the residual quantity of the item is equal to or less than a first residual quantity, based on the sensed weight information. The processor 80 may display, on the display 910, a result of searching a shopping site for an item having the same type as the item when the residual quantity of the item is equal to or less than a second residual quantity, based on the sensed weight information. When the weight-sensitive storage area 100 includes a plurality of weight-sensitive sections, the processor 80 may set at least two adjacent weight-sensitive sections together as one weight-sensitive section according to information received through the inputter 920 and display a setting result on the display 910.

The processor 80 may transmit the weight information to the external device 990, for example, by a wired communication method or a wireless communication method. The external device 990 may include a processor capable of driving an application program for management of items, a display, and an inputter. A storage management process performed by the processor 80 described above may be performed in the same manner by the processor of the external device 990 receiving the weight information.

Methods of managing items stored in a refrigerator according to embodiments of the disclosure will be described below. A method of managing an item stored in a refrigerator according to an embodiment of the disclosure may include receiving information about an item, which is to be stored on a weight-sensitive storage area of a door shelf mounted on a door of the refrigerator, through a user interface or an external device and setting the information as initial item information; and transmitting weight information of the item sensed by the weight-sensitive storage area to a processor of the refrigerator. For example, the method may include, when the sensed weight information is the same as a set weight, setting as a stock date a date when the sensed weight information is transmitted, and displaying the stock date on the user interface or a display of an external device. For example, the method may include displaying a time period elapsed after a date when the item was stored on the user interface or the display of the external device, based on the stock date. For example, the method may include displaying a residual quantity of the item on the user interface or the display of the external device, based on the sensed weight information. For example, the method may include displaying a notification displaying that exhaustion of the item is imminent on the user interface or the display of the external device when the residual quantity of the item is equal to or less than a first residual quantity, based on the sensed weight information. For example, the method may include displaying a result of searching a shopping site for an item of the same type as the item on the user interface or the display of the external device when the residual quantity of the item is equal to or less than a second residual quantity, based on the sensed weight information. For example, when the weight-sensitive storage area includes a plurality of weight-sensitive sections, the method may include setting at least two adjacent weight-sensitive sections together as one weight-sensitive section by using the user interface or external device and displaying a setting result on the display. For example, the user interface may be an operation panel of the refrigerator. For example, the external device may be a PC or a personal portable terminal connected to the refrigerator via a wire or wirelessly.

Figure 19:
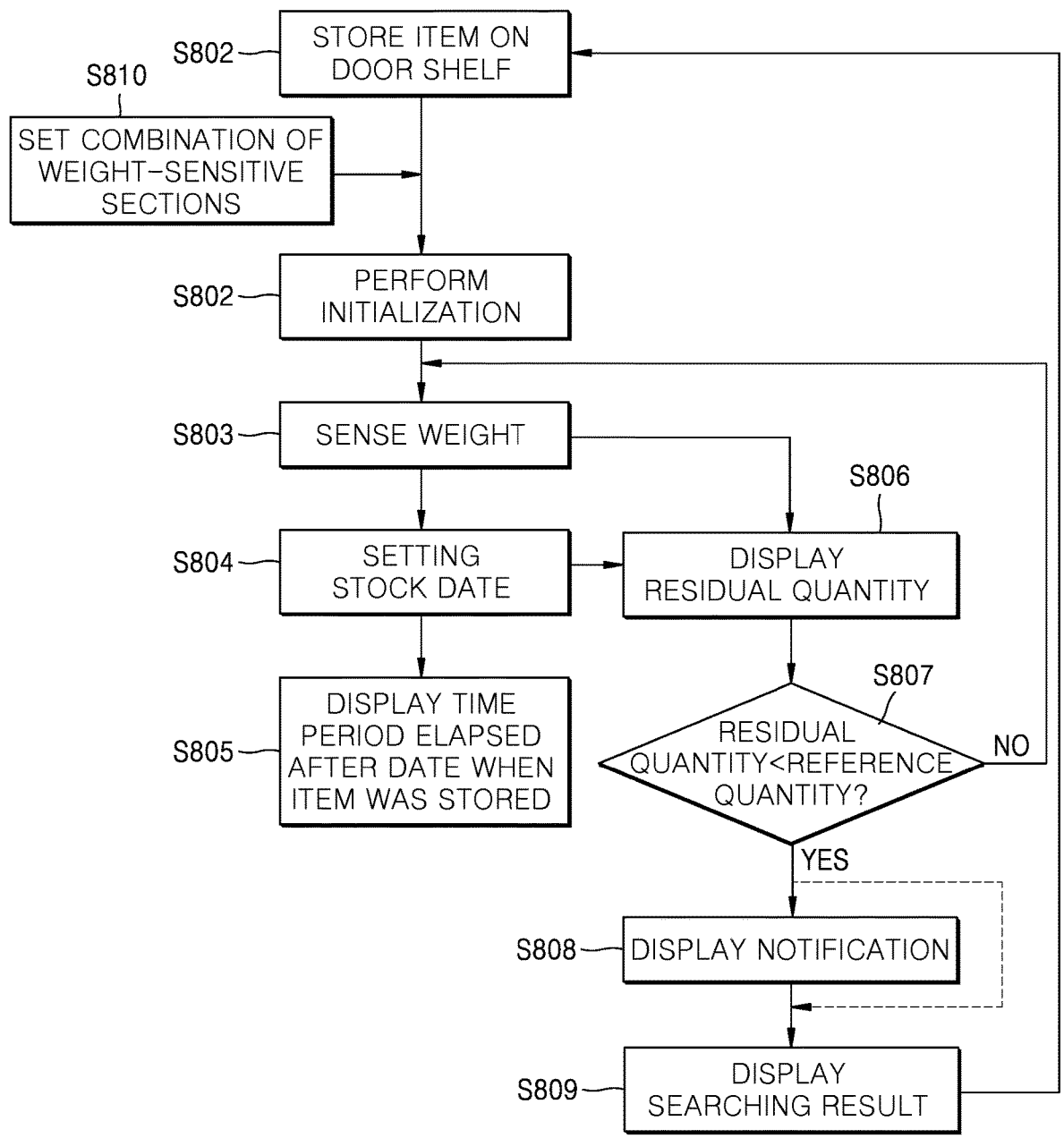
FIG. 19 is a flowchart of an example of a method of managing an item stored in a refrigerator.

FIG. 19 is a flowchart of an example of a method of managing an item stored in a refrigerator. FIGS. 20A, 20B, 20C, 21, 22, 23, and 24 illustrate examples of a GUI screen provided on the display 910 of the user interface 900. An example of the method of managing an item stored in a refrigerator will be described in detail with reference to FIGS. 19 to 24 below. In the following description, the user interface 900 may be the operation panel 29 of the refrigerator described above, and the external device 990 connected to the refrigerator may be, for example, a PC or a personal portable terminal such as a smartphone or a tablet PC. The operation panel 29, the PC, and the personal portable terminal may be connected to, for example, the refrigerator via a wire or wirelessly. The operation panel 29, the PC, and the personal portable terminal may be connected to the processor 80, for example, via a wire or wirelessly.

An example of the method of managing an item stored in a refrigerator may include setting basic information of an item, which is to be stored on the weight-sensitive storage area 100 of the door shelf 50 on the door 20 of the refrigerator 1, through the user interface 900 connected to the refrigerator 1, and transmitting weight information of the item from the weight-sensitive storage area 100 to the user interface 900. A case in which the weight-sensitive storage area 100 includes two weight-sensitive sections 101 and 102 will be described as an example below. The two weight-sensitive sections 101 and 102 will be hereinafter referred to as a left shelf 101 and a right shelf 102, respectively.

Figure 20A:
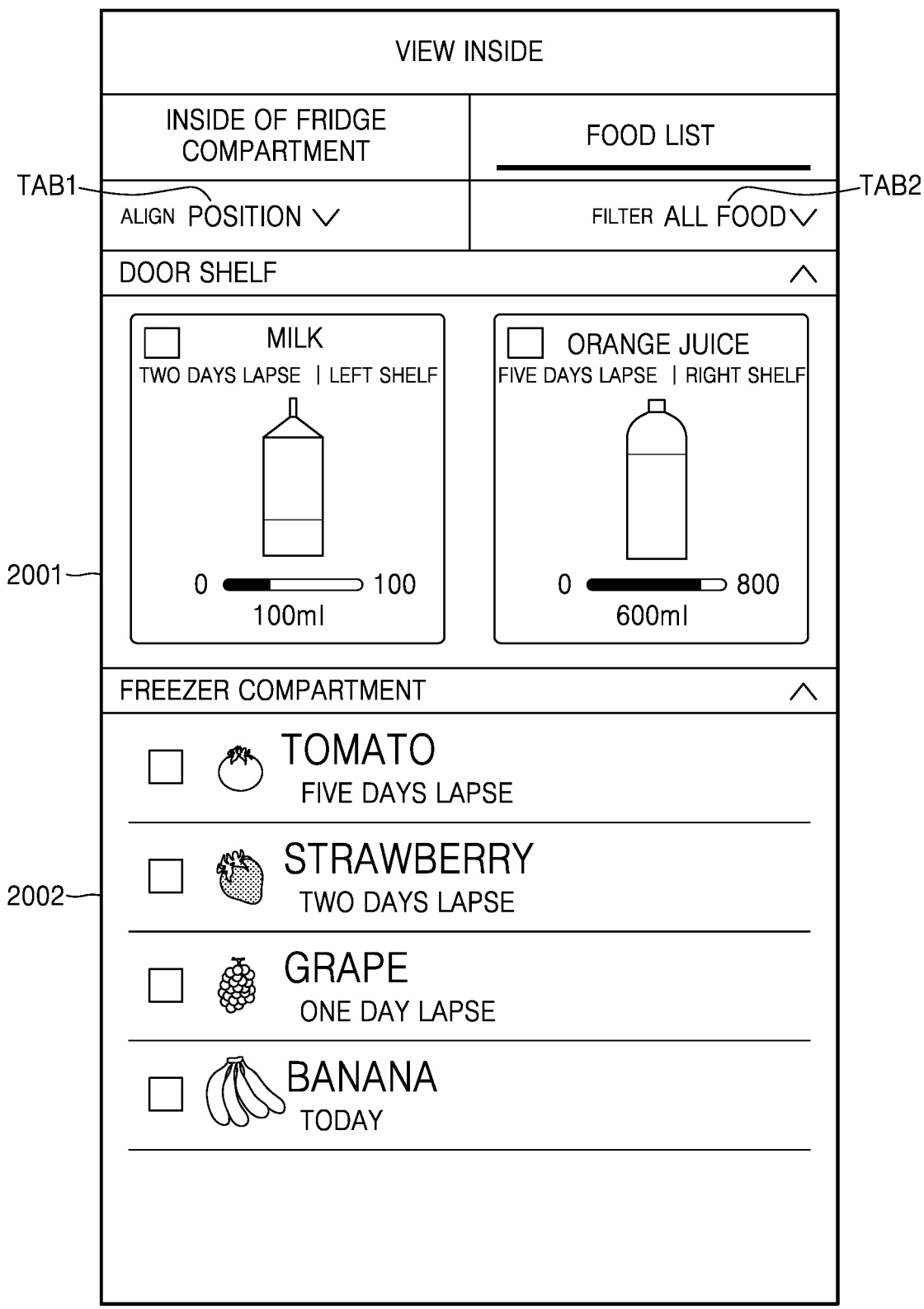
FIG. 20A illustrates an example of a graphical user interface (GUI) screen provided on a display of a user interface.

An item is stored on the door shelf 50 (S801). The processor 80 provides a user interface screen on the display 910 through an application program. A user may perform initialization (S802) to set initial information about the item through the display 910 and the inputter 920. FIG. 20A illustrates an example of a GUI screen provided on the display 910 of the user interface 900. Referring to FIG. 20A, the GUI screen may include a first status window 2001 displaying a state in the fridge compartment 11 and a second status window 2002 displaying a state in the freezer compartment 12. The first status window 2001 may display graphic images corresponding to the left shelf 101 and the right shelf 102. The second status window 2002 may display information about items stored in the freezer compartment 12 in the form of graphic image.

Figure 20B:
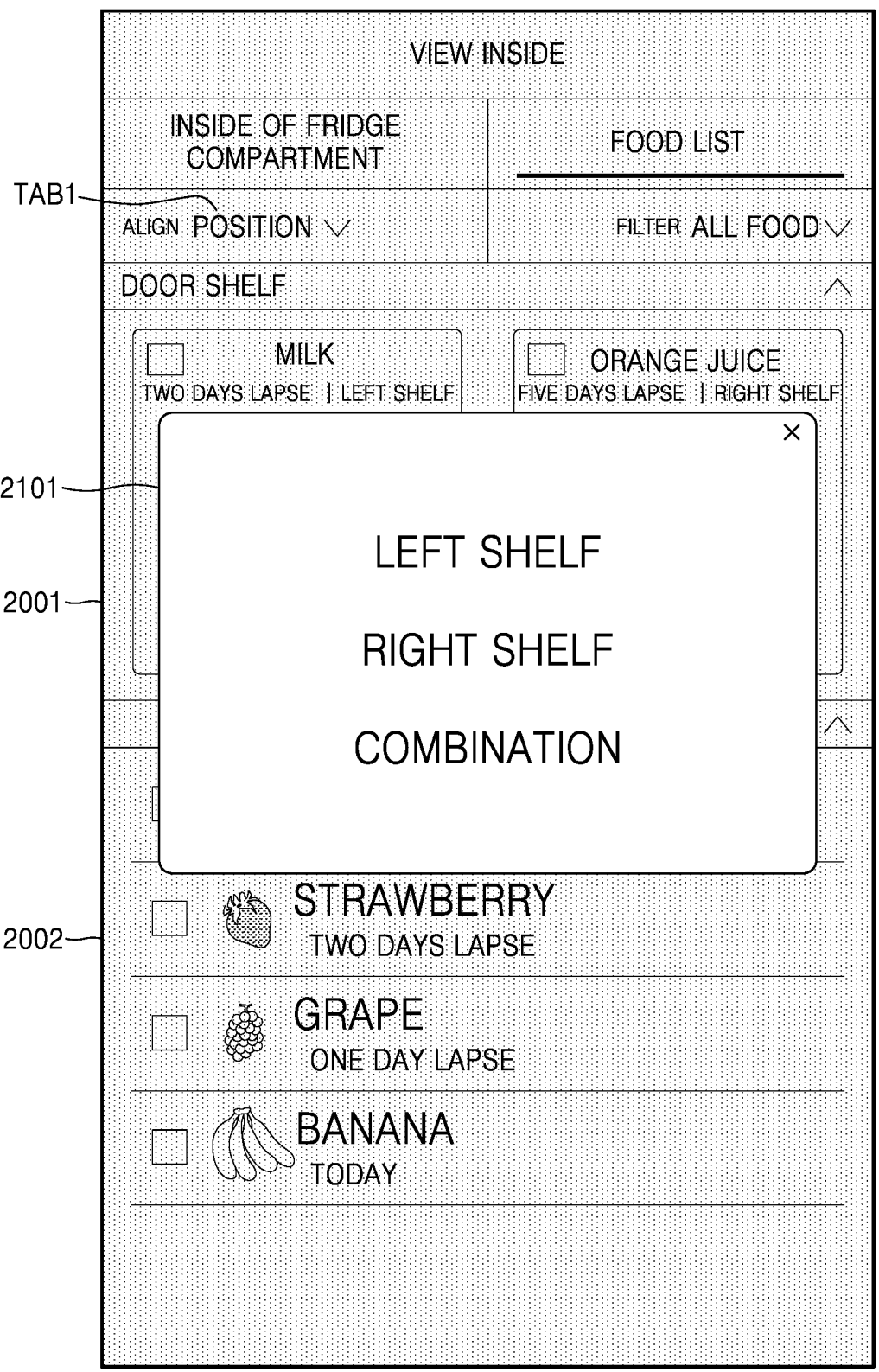
FIG. 20B illustrates an example of a GUI screen provided on a display of a user interface when a first tab is selected.

The first status window 2001 may include a plurality of tabs selectable to set initial information of items. For example, a first tab TAB1 is a tab for specifying a location at which an item is to be stored. FIG. 20B illustrates an example of a GUI screen provided on the display 910 of the user interface 900 when the first tab TAB1 is selected. Referring to FIG. 20B, when the first tab Tab1 is selected, for example, a sub-selection window 2101 for selecting the left shelf 101 and the right shelf 102 is displayed. A user may select the left shelf 101 and the right shelf 102 by touching or using the inputter 920. Alternatively, a combination of the left shelf 101 and the right shelf 102 may be selected as described below.

Figure 20C:
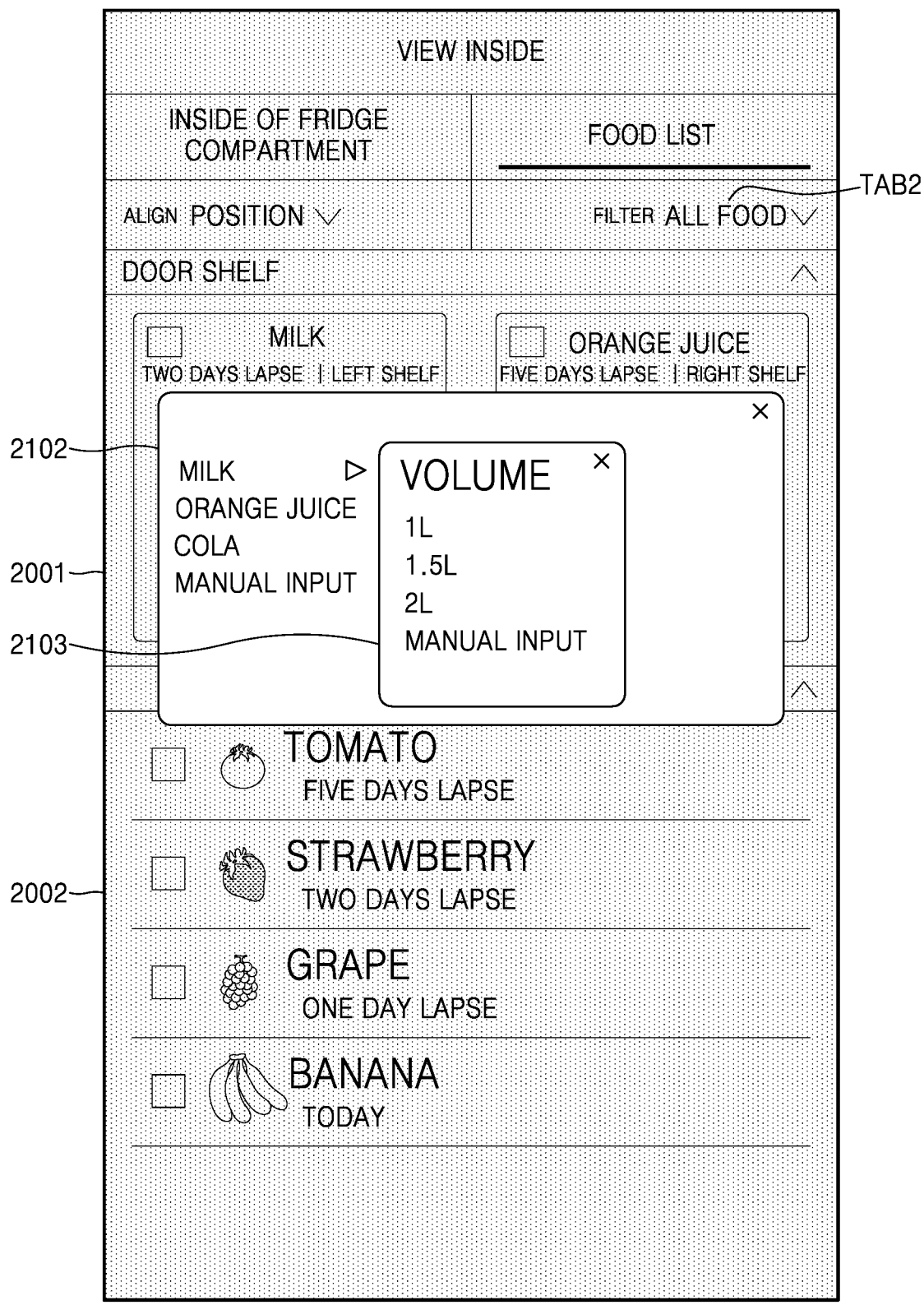
FIG. 20C illustrates an example of a GUI screen provided on a display of a user interface when a second tab is selected.

For example, a second tab TAB2 is a tab for inputting information about an item to be stored on a selected shelf. FIG. 20C illustrates an example of a GUI screen provided on the display 910 of the user interface 900 when the second tab TAB is selected. By selecting the second tab TAB2, the type and quantity of an item, a weight of each item, the type of a storage container of the item, etc. may be set. For example, when the second tab Tab2 is selected, a sub-selection window 2102 for selecting the type of an item may be displayed. A user may set the type of an item by touching or using the inputter 920. When the setting of the type of an item is complete, a sub-selection window 2103 for selecting a quantity of the item may be displayed. A user may select or input a quantity of an item by touching or using the inputter 920. A form, a total number, etc. of sub-selection windows may be variously determined according to properties of a configurable item. The first status window 2001 may display information about items stored on the left shelf 101 and the right shelf 102 of the door shelf 50 in the form of an image and/or text information. The first status window 2001 shown in FIG. 20A displays, for example, a state in which 1 L of milk is stored on the left shelf 101 and 800 mL of orange juice is stored on the right shelf 102.

The weight transmission device 140 senses a weight of an item (S803) and transmits sensed weight information to the processor 80. Electrical signals are generated by corresponding weight-sensitive sensors 130 according to weights of items stored on the left shelf 101 and the right shelf 102, and transmitted to the weight transmission device 140. The weight transmission device 140 converts the electrical signals into, for example, digital weight signals through a signal processing process. The weight transmission device 140 transmits the weight signals of the left shelf 101 and the weight signals of the right shelf 102 to the processor 80, for example, by a Bluetooth communication method.

An example of the method of managing an item stored in a refrigerator may include setting, as a stock date, a date when the sensed weight information has been transmitted when the sensed weight information is equal to a set weight (S804). The processor 80 calculates a weight of an item on the left shelf 101 and a weight of an item on the right shelf 10 from a received weight signal. The processor 80 may set, as a stock date, a date when the sensed weight information has been transmitted when the sensed weight information is the same as an item weight set by a user. The stock date may be displayed on the display 910.

The stock date is a criterion for a time period elapsed after a date when the item was stored. An example of the method of managing an item stored in a refrigerator may include displaying the time period elapsed after the date when the item was stored on the display 910, based on the stock date (S805). The processor 80 may display the time period elapsed after the date when the item was stored on the display 910, based on the stock date. The first status window 2001 shown in FIG. 20A displays, for example, that a time period elapsed after a date when milk was stored on the left shelf 101 is two days and a time period elapsed after a date when orange juice was stored on the right shelf 102 is five days.

An example of the method of managing an item stored in a refrigerator may include displaying a residual quantity of the item on the display 910, based on the sensed weight information (S806). The processor 80 may display the residual quantity of the item on the display 910, based on the sensed weight information. For example, the residual quantity of the item may be displayed in various forms. For example, the residual quantity of the item may be displayed in various forms, e.g., a current weight (volume) of the item, a ratio of the residual quantity of the item to an original weight (volume) of the item, etc. The first status window 2001 shown in FIG. 20A displays, for example, an initial quantity and a residual quantity of each of the milk stored on the left shelf 101 and the orange juice stored on the right shelf 102 numerically, and displays a ratio of the residual quantity to the initial quantity in the form of a bar graph.

The weight transmission device 140 may transmit weight information to the processor 80 periodically at predetermined intervals, e.g., one-hour intervals or one-day intervals. The weight transmission device 140 may transmit weight information to the processor 80 each time the door 20 is opened or closed. The weight transmission device 140 may transmit weight information to the processor 80 when there is a change in the weight information. Although not shown, a condition of a time when weight information is transmitted may be set, for example, as a periodic transmission mode, a transmission mode when the door is opened or closed, a transmission mode when there is a change in a weight, or the like.

Figure 21:
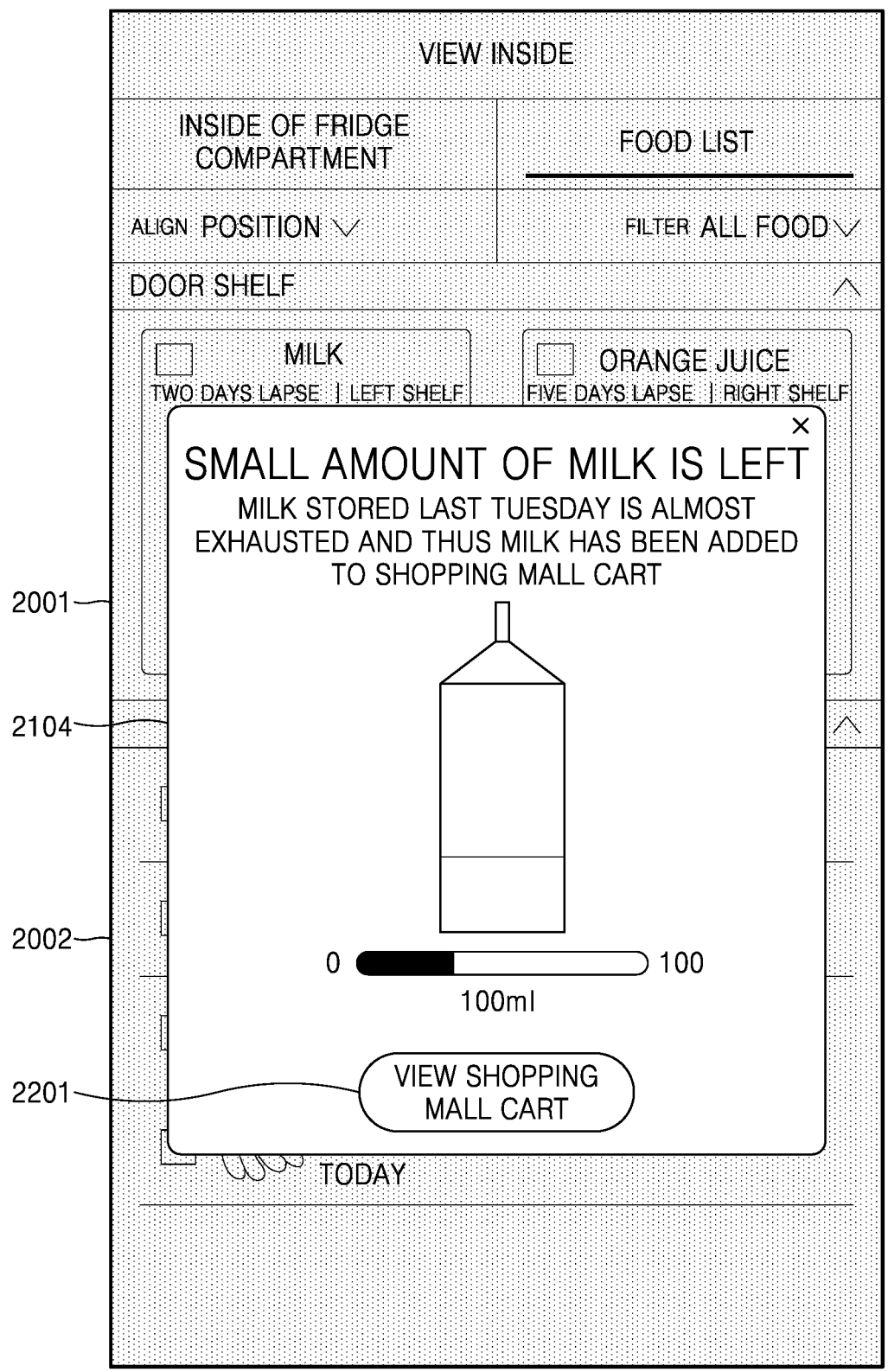
FIG. 21 illustrates a GUI screen showing an example of a notification displaying that exhaustion of an item is imminent.

An example of the method of managing an item in a refrigerator may include displaying on the user interface 900 a notification displaying that exhaustion of an item is imminent when a residual quantity of the item is equal to or less than a reference residual quantity (a first residual quantity), based on the sensed weight information (S807 and S808). FIG. 21 illustrates a GUI screen showing an example of a notification displaying that exhaustion of an item is imminent. Referring to FIG. 21, when it is determined from the sensed weight information transmitted from the weight transmission device 140 that, for example, a residual quantity of milk stored on the left shelf 101 is 10% or less of an initial quantity of the milk, which is a reference residual quantity, the processor 80 may display a notification window 2104 displaying that exhaustion of the milk stored on the left shelf 101 is imminent on the display 910. Therefore, a user may be induced to determine to buy an item, e.g., milk. Contents of the notification window 2104 are not particularly limited. For example, FIG. 21 illustrates a message indicating that milk is almost exhausted and thus is added to a shopping mall cart. The notification window 2104 may display a link tab 2201 linked to a shopping site. A user may select the link tab 2201 to start a purchase procedure through the shopping site.

Figure 22:
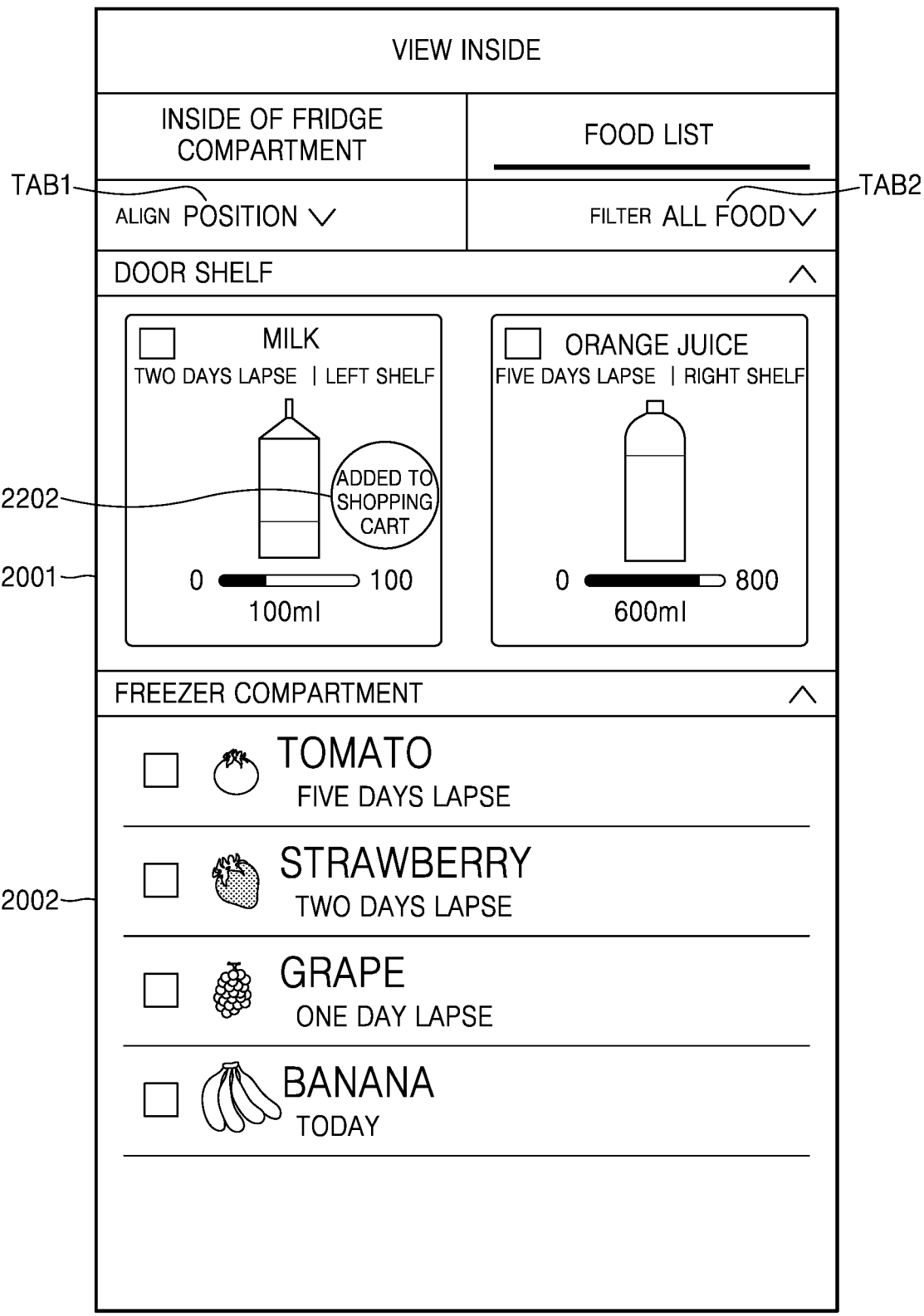
FIG. 22 illustrates a GUI screen showing an example of a notification displaying that exhaustion of an item is imminent.

FIG. 22 illustrates a GUI screen showing an example of a notification displaying that exhaustion of an item is imminent. Referring to FIG. 22, when it is determined from sensed weight information transmitted from the weight transmission device 140 that, for example, a residual quantity of milk stored on the left shelf 101 reaches 10% or less of an initial quantity thereof, which is a reference residual quantity, the processor 80 may display a link tab 2202, for purchasing an item of the same type as the milk at a shopping site, in the form of an image on a first status window 2001 of the display 910, e.g., near a graphic image of the left shelf 101. A user may start a procedure of purchasing an item of the same type as a currently stored item at a corresponding shopping site, for example, by selecting the link tab 2202.

Figure 23:
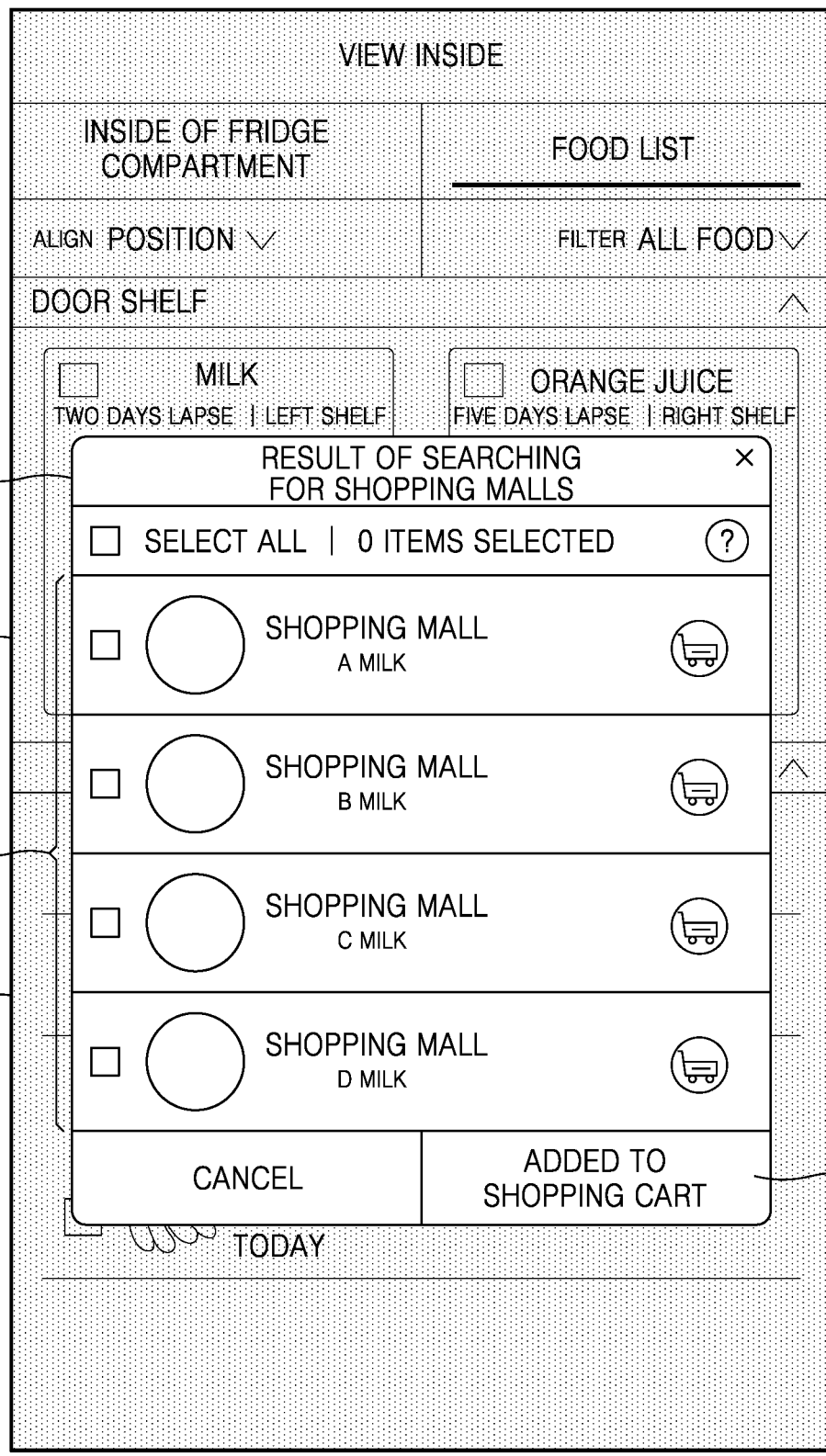
FIG. 23 illustrates a GUI screen showing an example of a search result.

An example of the method of managing an item stored in a refrigerator may include displaying on the display 910 a result of searching a shopping site for an item of the same type as the item when a residual quantity of an item is equal to or less than a reference residual quantity (a second residual quantity), based on sensed weight information (S809). FIG. 23 illustrates a GUI screen showing an example of a search result. Referring to FIG. 23, a reference residual quantity (a second residual quantity) may be equal to or less than, for example, a reference residual quantity (a first residual quantity) indicating that exhaustion of an item is imminent. In the present example, the first residual quantity and the second residual quantity are the same. When it is determined from sensed weight information transmitted from the weight transmission device 140 that, for example, a residual quantity of milk stored on the left shelf 101 reaches 10% or less of an initial quantity of the milk, which is a reference residual quantity, the processor 80 may display a display window 2105 displaying a result of searching for, for example, an item of the same type as the milk stored on the left shelf 101 on the display 910. Contents displayed on the display window 2105 may include, for example, a shopping site, the type of an item, a quantity of the item, the price of the item, etc. The display window 2104 may display a selection indicator 2203 for selecting whether to purchase a searched-for item and a purchase link tab 2204 for starting a procedure of purchasing a selected item.

An example of the method of managing an item stored in a refrigerator may include setting at least two adjacent weight-sensitive sections 101 and 102 together as one weight-sensitive section through the user interface 900, when the weight-sensitive storage area 100 includes a plurality of weight-sensitive sections 101 and 102 (S810). For example, referring to FIG. 20B, when the first tab TAB1 is selected, the sub-selection window 2101 for selecting the left shelf 101, the right shelf 102, or a "combination" is displayed. When a user selects "combination" by touching or using the inputter 920, the left shelf 101 and the right shelf 102 are combined together as one integrated weight-sensitive storage area. In this case, when necessary, the user may open the door 20, and remove the blocking member 190 between the left shelf 101 and the right shelf 102 or switch the blocking member 190a, 190b, 190c or 190d from the blocking position to the retreat position. The processor 80 may combine all of multiple pieces of weight information transmitted from the weight transmission device 140 and display information about items stored on the integrated weight-sensitive storage area.

Figure 24:
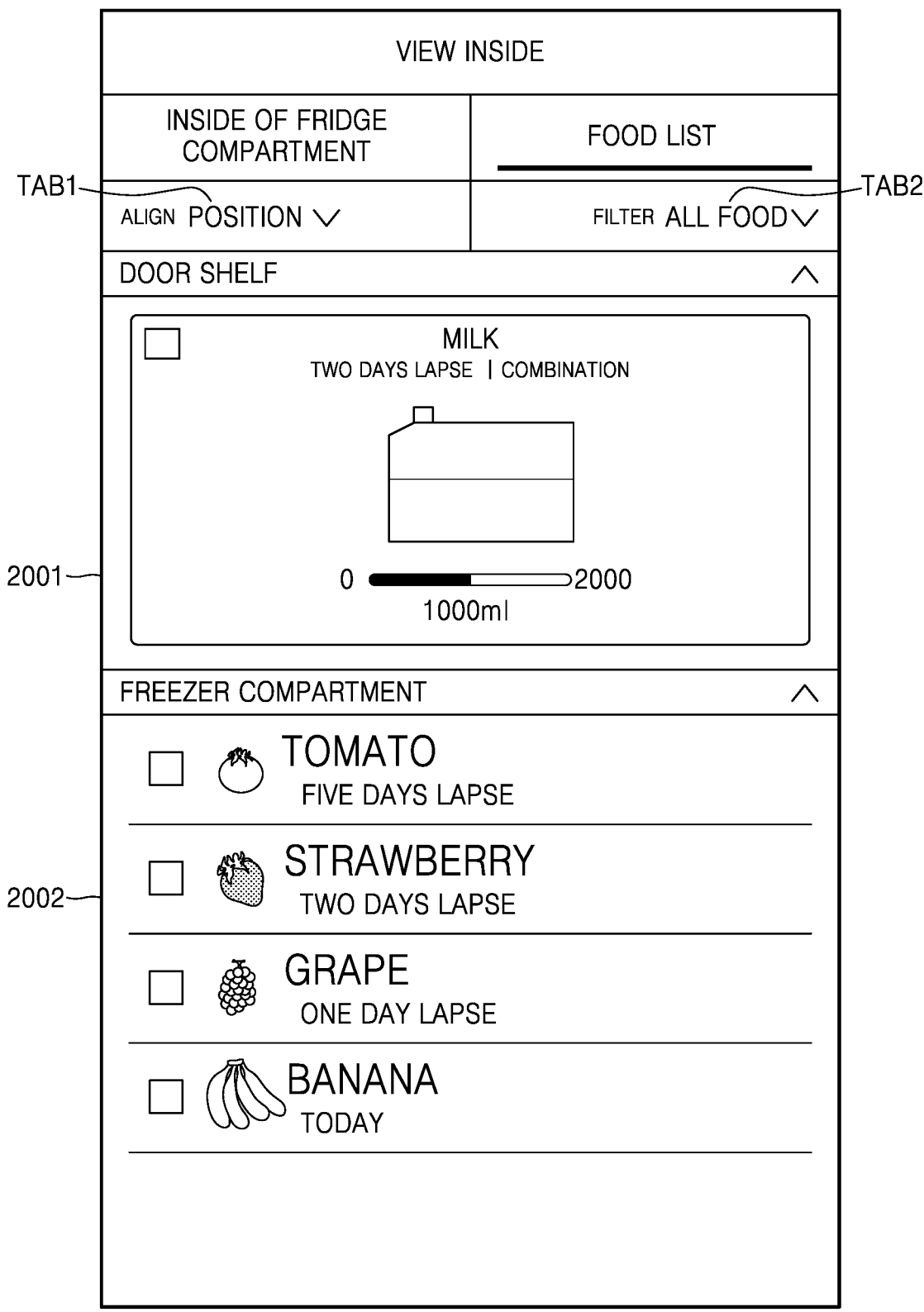
FIG. 24 illustrates an example of a GUI screen provided on a display of a user interface.

FIG. 24 illustrates an example of a GUI screen provided on the display 910 of the user interface 900. Referring to FIG. 24, the left shelf 101 and the right shelf 102 are combined together as one integrated weight-sensitive storage area. Information such as the type of an item stored on the integrated weight sensing area, the quantity of the item, etc. may be set using the second tab TAB2. For example, it is displayed that 2 L of milk has been stored on the integrated weight-sensitive storage area and a residual quantity of the milk is 1000 ml. For example, a time period elapsed after a date when the milk was stored on the integrated weight-sensitive storage area is displayed as two days.

While embodiments of the disclosure have been described above in detail above, the scope of the disclosure is not limited thereto, and it should be understood that various modifications and improvements made by those of ordinary skill in the art using the basic concepts of the disclosure defined in the following claims are included within the scope of the disclosure.

What is claims is:

1. A refrigerator comprising:
    a door;
    a door shelf provided at the door and including a weight-sensitive storage area for sensing a weight value of an item positioned on the weight-sensitive storage area;
    a weight transmission transceiver installable on the door shelf and configured to transmit information about the sensed weight value;
    a user interface including a display and an inputter; and
    a processor configured to manage item information, based on the sensed weight value received from the weight transmission transceiver, and control the display to display management information about the item, wherein the weight-sensitive storage area includes a plurality of weight-sensitive sections, and
the door shelf further includes a blocking member configured to be switched between a blocking position at which a movement of items between the plurality of weight-sensitive sections is blocked and a retreat position away from the blocking position at which the movement of items is permitted.

2. The refrigerator of claim 1, wherein the weight-sensitive storage area comprises:
a first member supported on the door shelf; and
a plurality of second members supported on the first member with a weight-sensitive sensor interposed therebetween, configured to have items placed thereon, and corresponding to the plurality of weight-sensitive sections,
wherein the weight-sensitive sensor is connected to the weight transmission transceiver.

3. The refrigerator of claim 2, wherein the blocking member is positioned between the plurality of second members to restrict movement of items positioned on the plurality of second members at the blocking position.

4. The refrigerator of claim 3, wherein the blocking member is positioned higher than upper surfaces of the plurality of second members to restrict movement of items positioned on the plurality of second members at the blocking position.

5. The refrigerator of claim 1, wherein the door shelf comprises a simple storage area which does not sense a weight of an item, and a partition wall formed to separate the weight-sensitive storage area and the simple storage area from each other.

6. The refrigerator of claim 5, wherein the blocking member is installed on the partition wall.

7. The refrigerator of claim 1, further comprising:
a power supply provided at the door and configured to supply power to the weight transmission transceiver; and
a power receiver connectable to the weight transmission transceiver, and provided at the door shelf to connect to the power supply when the door shelf is mounted on the door.

8. The refrigerator of claim 7, wherein the power supply comprises a wireless power transmitter,
the power receiver comprises a wireless power receiver connectable to the weight transmission transceiver and provided at the door shelf to face the wireless power transmitter when the door shelf is mounted on the door, and
the refrigerator further comprises a moisture-blocking wall configured to protect the wireless power transmitter from moisture, the moisture-blocking wall being provided at the door to protrude along edges of the wireless power transmitter.

9. The refrigerator of claim 8, wherein the wireless power receiver is at least partially recessed in a wall forming an outer side of the door shelf.

10. The refrigerator of claim 1, wherein the weight transmission transceiver is further configured to transmit the sensed weight value to the processor by a Bluetooth communication method.

11. The refrigerator of claim 1, wherein the display comprises a touch panel display integrated with the inputter.

12. The refrigerator of claim 1, wherein the processor is further configured to:
receive information about an item to be stored on the weight-sensitive storage area of the door shelf through the inputter and set the received information as initial information about the item;
when the sensed weight value is the same as a set weight, set a stock date when the sensed weight value has been transmitted;
control the display to display the stock date.

13. The refrigerator of claim 12, wherein the processor is further configured to control the display to display a time period elapsed after a date when the item has been stored, based on the stock date.

14. The refrigerator of claim 1, wherein the processor is further configured to control the display to display a residual quantity of the item, based on the sensed weight value.

15. The refrigerator of claim 1, wherein, when a residual quantity of the item is equal to or less than a first residual quantity, based on the sensed weight value, the processor is further configured to control the display to display a notification displaying that exhaustion of the item is imminent.

16. The refrigerator of claim 1, wherein, when a residual quantity of the item is equal to or less than a second residual quantity, based on the sensed weight value, the processor is further configured to control the display to display a result of searching a shopping site for an item of the same type as the item.

17. The refrigerator of claim 1, wherein, when the weight-sensitive storage area includes a plurality of weight-sensitive sections, the processor is further configured to set at least two adjacent weight-sensitive storage sections together as one weight-sensitive section by using the user interface and control the display to display a result of the setting on the display.

18. The refrigerator of claim 1, wherein the processor is further configured to transmit the sensed weight value to an external device.

19. A refrigerator comprising:
a door;
a door shelf provided at the door and including a weight-sensitive storage area for sensing a weight value of an item positioned on the weight-sensitive storage area;
a weight transmission transceiver installable on the door shelf and configured to transmit information about the sensed weight value;
a user interface including a display and an inputter; and
a processor configured to manage item information, based on the sensed weight value received from the weight transmission transceiver, and control the display to display management information about the item,
wherein the processor is further configured to:
receive information about an item to be stored on the weight-sensitive storage area of the door shelf through the inputter and set the received information as initial information about the item,
when the sensed weight value is the same as a set weight, set a stock date when the sensed weight value has been transmitted,
control the display to display the stock date.

20. A refrigerator comprising:
a door;
a door shelf provided at the door and including a weight-sensitive storage area for sensing a weight value of an item positioned on the weight-sensitive storage area;
a weight transmission transceiver installable on the door shelf and configured to transmit information about the sensed weight value;
a user interface including a display and an inputter; and
a processor configured to manage item information, based on the sensed weight value received from the weight transmission transceiver, and control the display to display management information about the item, wherein, when a residual quantity of the item is equal to or less than a first residual quantity, based on the sensed weight value, the processor is further configured to control the display to display a notification displaying that exhaustion of the item is imminent.

21. A refrigerator comprising:

a door;

a door shelf provided at the door and including a weight-sensitive storage area for sensing a weight value of an item positioned on the weight-sensitive storage area;

a weight transmission transceiver installable on the door shelf and configured to transmit information about the sensed weight value;

a user interface including a display and an inputter; and a processor configured to manage item information, based on the sensed weight value received from the weight transmission transceiver, and control the display to display management information about the item, wherein, when a residual quantity of the item is equal to or less than a second residual quantity, based on the sensed weight value, the processor is further configured to control the display to display a result of searching a shopping site for an item of the same type as the item.

22. A refrigerator comprising:

a door;

a door shelf provided at the door and including a weight-sensitive storage area for sensing a weight value of an item positioned on the weight-sensitive storage area;

a weight transmission transceiver installable on the door shelf and configured to transmit information about the sensed weight value;

a user interface including a display and an inputter; and a processor configured to manage item information, based on the sensed weight value received from the weight transmission transceiver, and control the display to display management information about the item, wherein, when the weight-sensitive storage area includes a plurality of weight-sensitive sections, the processor is further configured to set at least two adjacent weight-sensitive storage sections together as one weight-sensitive section by using the user interface and control the display to display a result of the setting on the display.

* * * * *